(12) United States Patent
Dicklin et al.

(10) Patent No.: US 12,346,366 B2
(45) Date of Patent: Jul. 1, 2025

(54) PROVIDING GENERATIVE ANSWERS INCLUDING CITATIONS TO SOURCE DOCUMENTS

(71) Applicant: Google LLC, Mountain View, CA (US)

(72) Inventors: Zachary Dicklin, Boulder, CO (US);
Michael Colagrosso, Arvada, CO (US);
Remy Burger, Boulder, CO (US);
Michael Bendersky, Cupertino, CA (US); Brandon Vargo, Boulder, CO (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/472,190

(22) Filed: Sep. 21, 2023

(65) Prior Publication Data
US 2025/0103640 A1    Mar. 27, 2025

(51) Int. Cl.
*G06F 16/33*      (2025.01)
*G06F 16/3332*    (2025.01)
*G06F 16/38*      (2019.01)

(52) U.S. Cl.
CPC ........ *G06F 16/382* (2019.01); *G06F 16/3334* (2019.01)

(58) Field of Classification Search
CPC ............................ G06F 16/382; G06F 16/3334
See application file for complete search history.

(56) References Cited

U.S. PATENT DOCUMENTS

| | | | |
|---|---|---|---|
| 9,842,113 B1 | 12/2017 | Sorvillo et al. | |
| 11,243,912 B2 | 2/2022 | Sorvillo et al. | |
| 11,681,654 B2 | 6/2023 | Sorvillo et al. | |
| 2016/0306798 A1 | 10/2016 | Guo et al. | |
| 2019/0294727 A1 | 9/2019 | Kohlmeier et al. | |
| 2020/0133662 A1* | 4/2020 | Smith | G06N 3/045 |
| 2021/0133251 A1 | 5/2021 | Tiwari et al. | |
| 2024/0289378 A1* | 8/2024 | Lutz | G06F 16/41 |

OTHER PUBLICATIONS

"Introducing Dropbox Dash, AI-powered universal search, and Dropbox AI," https://blog.dropbox.com/topics/product/introducing-AI-powered-tools; Jun. 21, 2023, 10 pages.
(Continued)

*Primary Examiner* — Etienne P Leroux
*Assistant Examiner* — Cindy Nguyen
(74) *Attorney, Agent, or Firm* — Lowenstein Sandler LLP

(57) ABSTRACT

Systems and methods include pre-processing documents in cloud storage using query embeddings, providing personalized prompts to users based on documents in cloud storage, real-time anticipation of user interest in information contained in documents in cloud storage, and providing generative answers including citation to source documents in cloud storage. The system and methods generate generative machine learning model (MLM) prompts based on document portions of documents in a cloud-based content management platform. The systems and methods use the generative MLM to generate responses to prompts, and the responses include citations to the document portions used to generate the responses in order for users to verify the responses.

20 Claims, 15 Drawing Sheets

(56) References Cited

OTHER PUBLICATIONS

"How to use the Dropbox Dash desktop app," https://help.dropbox.com/view-edit/dropbox-dash-overview; Sep. 7, 2023, 3 pages.
"Dropbox Dash: an overview," https://help.dropbox.com/view-edit/dropbox-dash-on-desktop; Sep. 7, 2023, 3 pages.
"Generative AI and semantic search for the Enterprise," https://nuclia.com; accessed Sep. 27, 2023, 10 pages.
"What does search mean?," https://docs.nuclia.dev/docs; accessed Sep. 27, 2023, 2 pages.
Kwiatkowski, et al., "Natural Questions: A Benchmark for Question Answering Research," Transactions of the Association for Computational Linguistics, vol. 7, pp. 453-466, 2019. https://doi.org/10.1162/tacl_a_00276.
Sun, et al., "Recitation-Augmented Language Models," Published as a Conference Paper at ICLR 2023, arXiv:2210.01296v2 [cs.CL] Feb. 16, 2023, 23 pages. https://doi.org/10.48550/arXiv.2210.01296.
Camara A., et al., "Searching, Learning, and Subtopic Ordering: A Simulation-based Analysis," arXiv, Jan. 2022, 15 Pages.
International Search Report and Written Opinion for International Application No. PCT/US2024/048012, mailed Dec. 2, 2024, 20 Pages.

\* cited by examiner

200

210
Select a portion of a document stored in a cloud-based management platform

220
Input a set of example statement-prompt pairs and the portion of the document into a generative MLM

230
Obtain generative MLM prompt associated with the portion of the document

240
Generate, using an embedding model, a query embedding based on the generative MLM prompt

250
Store an association of the query embedding with the portion of the document for subsequent use by the generative MLM

310
Select a document stored in a cloud-based management platform

320
For each document portion of the document:

322
Input a set of example statement-prompt pairs into a generative MLM

324
Generate, using the generative MLM, a generative MLM prompt associated with the document portion

326
Generate, using an embedding model, a query embedding based on the generative MLM prompt

328
Store an association of the query embedding with the portion of the document for subsequent use by the generative MLM

410
Select a portion of a document stored in a cloud-based management platform

420
Generate, using a generative MLM, a generative MLM prompt associated with the portion of the document

430
Generate, using an embedding model, a query embedding based on the generative MLM prompt

440
Store an association of the query embedding with the portion of the document for subsequent use by the generative MLM

510
Obtain a generative MLM prompt from a user interface

520
Generate, using an embedding model, a first query embedding based on the generative MLM prompt

530
Select, from multiple documents stored on a cloud-based content management platform, a subset of the multiple documents

540
Input the generative MLM prompt and the subset of the multiple documents into a generative MLM

550
Generate, using the generative MLM, a generative MLM response

610
Obtain a generative MLM prompt from a user interface

620
Input the generative MLM prompt and one or more documents into a generative MLM

630
Generate, using the generative MLM, a generative MLM response

640
Generate, using an embedding model, a query embedding based on the generative MLM response

650
Select a subset of the one or more documents portions of the one or more documents where the query embedding of each document portion is within a predetermined threshold similarity from the query embedding of the response

660
Include one or more citations to one or more document portions of the subset

710
Generate, using an embedding model, a first query embedding based on a generative MLM prompt

720
Select, from multiple documents stored on a cloud-based content management platform, a first subset of multiple documents

730
Select, from the subset of documents, a second subset based on an access permission of each document in the first subset

740
Input the generative MLM prompt and the second subset of the one or more documents into a generative MLM

750
Generate, using the generative MLM, a generative MLM response

910
Select multiple documents stored in a cloud-based content management platform

920
Select a portion of a document of the multiple documents

930
Generate, using a generative MLM, a first generative MLM prompt based on the portion of the document

940
Associate the first generative MLM prompt with the portion of the document

950
Cause the first generative MLM prompt to be presented to one or more users of the platform

1110
Identifying an action of a user of a cloud-based content management platform with respect to content of one or more first documents in a plurality of documents

1120
Predict user interest in content of one or more second documents in the plurality of documents:

1122
Select, based on a selection criterion, the one or more second documents

1124
Select, based on the action of the user, a portion of a document

1126
Generate, using a generative MLM, a first generative MLM prompt based on the portion of the document

1130
Cause the first generative MLM prompt to be presented to the user in relation to the action of the user

1210
Receive, at a user interface of a client device, an action of a user of a cloud-based content management platform

1220
Send, over a computer network, data identifying the action of the user to the cloud-based content management platform

1230
Receive, over the computer network, a generative MLM prompt from the platform

1240
Presenting, on the user interface, a selectable option to send the generative MLM prompt to the platform

FIG. 12

PROVIDING GENERATIVE ANSWERS INCLUDING CITATIONS TO SOURCE DOCUMENTS

TECHNICAL FIELD

Aspects and implementations of the present disclosure relate to a cloud-based content management platform, and more specifically, to providing generative answers that include citations to source documents at the cloud-based content management platform.

BACKGROUND

During online collaboration, users utilize various collaborative tools provided by a cloud-based content management platform over a computer network to work together. The collaborative tools can include document applications (e.g., word processor, presentation, and spreadsheet applications), a cloud-based document storage service, an online calendar service, an email service, or a messenger. The collaborative tools allow users to, over the network, share, edit, and comment on documents, schedule project timelines, communicate over emails or messenger messages, etc. With conventional collaborative tools, information a user needs to make a decision or take action may be found in disparate sources, often in documents in different locations, of different formats, and with different access permissions. A user may spend a significant amount of time gathering the information from the disparate sources when the user needs such information to make a decision or take action.

SUMMARY

The following is a simplified summary of the disclosure in order to provide a basic understanding of some aspects of the disclosure. This summary is not an extensive overview of the disclosure. It is not intended to either identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Systems and methods are disclosed for processing documents in cloud storage for query embeddings, providing personalized generative machine learning model (MLM) prompts to users based on documents in cloud storage, real-time anticipation of user interest in information contained in documents in cloud storage, and providing generative answers that include citations to source documents in cloud storage. Processing the documents for query embeddings helps gather cloud storage documents together that are similar to each other and similar to generative MLM prompts submitted by a user. Providing personalized prompts helps preemptively generate generative MLM prompts based on recent user activity on the cloud-based content management platform. Real-time anticipation of user interest helps generate generative MLM prompts based on recent user activity and on input provided by the user. Providing generative answers allows the platform to use a generative MLM to answer questions about information on the platform and perform tasks related to documents stored on the platform, and the generative MLM's response include citations to documents stored on the platform so the user can verify the response or obtain further information.

In one embodiment, systems and methods for processing documents in cloud storage for query embeddings may include selecting a portion of a document stored in a cloud-based content management platform, inputting a set of example statement-prompt pairs and the selected portion of the document into a generative MLM, obtaining an output from the generative MLM (which includes a generative MLM prompt), generating query embeddings based on the generative MLM prompt, and storing an association of the query embeddings with the selected document portion for subsequent use by the generative MLM to provide information related to content of the documents to user of the cloud-based management platform.

Systems and methods for providing personalized prompts based on documents in cloud storage may include selecting multiple documents stored in the cloud-based content management platform based on a selection criterion, selecting a portion of a document of the multiple documents, generating a first generative MLM prompt based on the document portion using a generative MLM, associating the first generative MLM prompt with the document portion, and causing the first generative MLM prompt to be presented to one or more users of the cloud-based content management platform when the one or more users access the cloud-based management platform.

In some embodiments, systems and methods for real-time anticipation of user interest in documents in cloud storage may include identifying an action of a user of a cloud-based content management platform with respect to content of one or more first documents stored at the platform and predicting user interest in content of one or more second documents stored at the platform. Predicting user interest may include selecting, based on a selection criterion, the one or more second documents, selecting a portion of the one or more second documents based on the action of the user, and generating a generative MLM prompt using a generative MLM based on the document portion. The systems and methods include causing the generative MLM prompt to be presented to the user in relation to the action of the user.

Systems and methods for providing generative answers may include obtaining a generative MLM prompt from a user interface, generating a first query embedding based on the generative MLM prompt using an embedding model, selecting a subset of multiple documents stored in the cloud-based content management platform based on the first query embedding and the generative MLM prompt, inputting the generative MLM prompt and the subset of documents into a generative MLM, and, generating a response using the generative MLM. The response may include one or more citations to one or more of the documents in the subset of documents.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 2 depicts a flowchart illustrating an example method for practicing selected aspects of the present disclosure.

FIG. 3 depicts a flowchart illustrating an example method for practicing selected aspects of the present disclosure.

FIG. 4 depicts a flowchart illustrating an example method for practicing selected aspects of the present disclosure.

FIG. 5 depicts a flowchart illustrating an example method for practicing selected aspects of the present disclosure.

FIG. 6 depicts a flowchart illustrating an example method for practicing selected aspects of the present disclosure.

FIG. 7 depicts a flowchart illustrating an example method for practicing selected aspects of the present disclosure.

FIG. 9 depicts a flowchart illustrating an example method for practicing selected aspects of the present disclosure.

FIG. 11 depicts a flowchart illustrating an example method for practicing selected aspects of the present disclosure.

FIG. 12 depicts a flowchart illustrating an example method for practicing selected aspects of the present disclosure.

DETAILED DESCRIPTION

Figure 1:
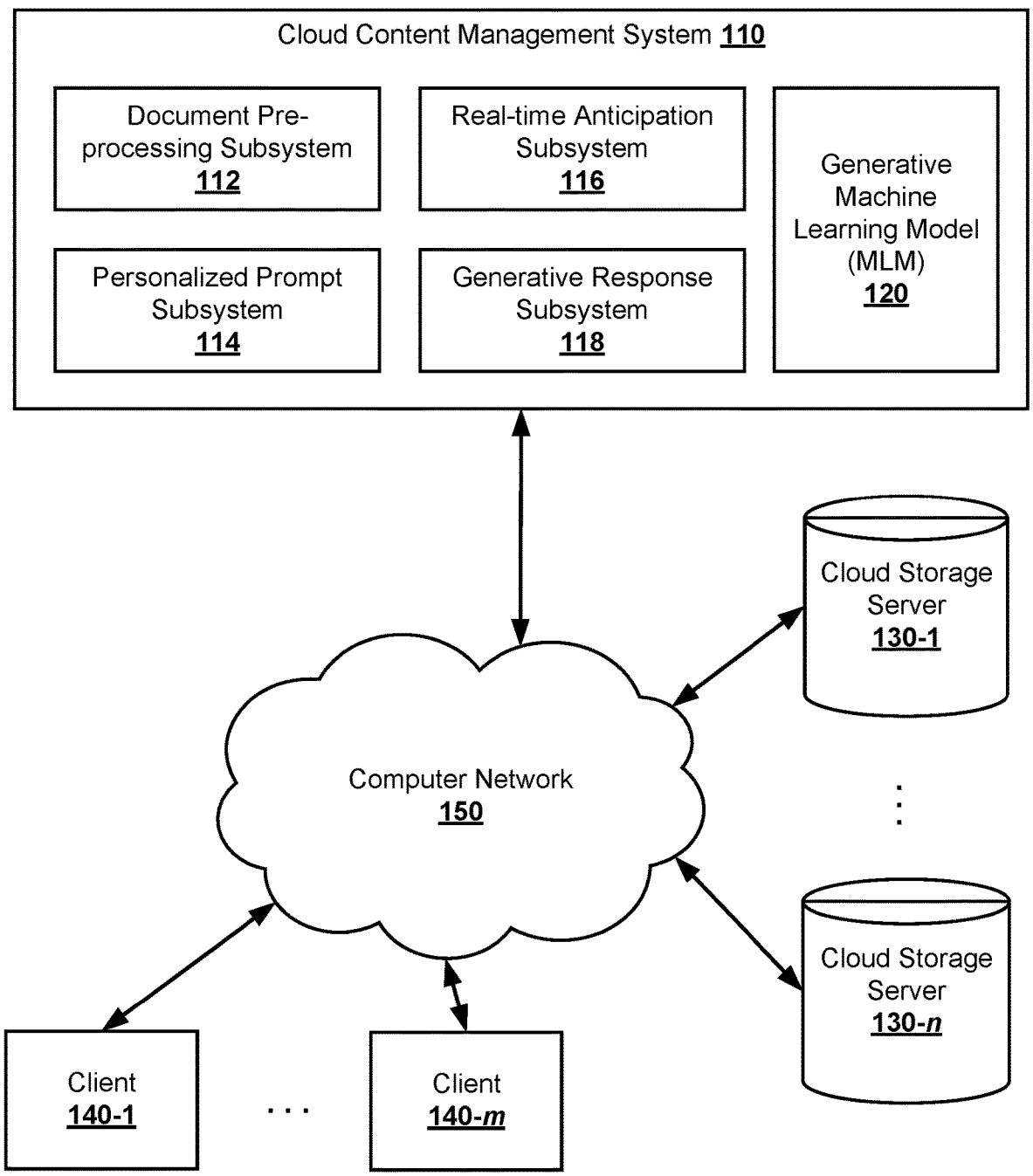
FIG. 1 schematically illustrates an example cloud-based content management platform in which selected aspects of the present disclosure may be implemented, in accordance with various implementations.

A cloud-based content management platform may provide collaborative tools such as document applications (e.g., word processor, presentation, and spreadsheet applications); a cloud-based document storage service that can store document application documents, image files, video files, audio files, or other file formats; an online calendar; an email service; a messenger, etc. The cloud-based content management platform allows users to collaborate on a document stored on the platform. Such collaboration may include, for example, reviewing, sharing, editing, or commenting on a document. For example, a user may share a document with another user, and in response to the sharing action, the other user may open and view the document, or edit the document. In another example, a user may edit a document, and in response to the editing action, the other user may respond by further editing the document, accepting the suggested edit, or commenting on the edit. In another example, a user may comment on a document, and in response to the commenting action, another user may reply to the comment or resolve the comment to close a comment thread. In another example, a user may schedule a calendar event to collaboratively edit a document with another user, and the other user may need to review the document to prepare for the pending calendar event. In another example, a user may send an email or messenger message to a user with information relevant to documents in the cloud-based storage system. In another example, multiple users may work on the documents stored on the platform concurrently and see each other's edits to or comments on the documents in real-time (e.g., within a few milliseconds of an occurrence of an edit or a comment).

The cloud-based data storage system may store numerous documents having information relevant to a user when making a decision or taking some other type of action. The different documents may be stored in different locations (e.g., in different folders in a cloud storage file system), in documents with different formats (e.g., word processing documents, emails, spreadsheets, and image files), and in documents with differing permissions (e.g., some documents may only be shared with certain users and may not be viewable by other users). However, to locate relevant documents, the user may need to spend a significant amount of time searching through and reviewing documents to find the relevant documents and the relevant portions of the documents. Such searching and reviewing may unduly delay collaboration, may be disruptive to the user experience and may result in use of a large amount of computing resources. Further, the numerous documents stored at the cloud-based data storage system may include documents that reflect an organization's wealth of knowledge (e.g., strategy documents, competitive analysis documents, design idea documents, etc.), which lies dormant until users know what to look for and where to find it. If the user is lacking this context, searching would not help the user with finding the documents containing information that can assist the user with making a decision or taking a particular action. As a result, the user often has to recreate information that already exists in some of the documents stored at the cloud-based data storage system, which leads to unnecessary consumption of storage and processing resources.

Aspects and implementations of the present disclosure address the above deficiencies, among others, by using a generative machine learning model (MLM) to provide a user with information needed to make a decision or take a particular action, based on relevant documents stored at the cloud-based data storage system and without relying on the user's knowledge of and searching for those documents. In some implementations, the generative MLM is trained to gather and analyze numerous documents stored at the cloud-based data storage system, derive meaning of content in the documents, and/or generate relevant information needed by a user to make a decision or perform an action.

The generative MLM model can use other machine learning models, including an encoder-decoder architecture that can include one or more self-attention mechanisms and one or more feed-forward mechanisms. In some embodiments, the generative MLM model can include an encoder that can encode input textual data into a vector space representation; and a decoder that can reconstruct the data from the vector space, generating outputs with increased novelty and uniqueness. The self-attention mechanism can compute the importance of phrases or words within a text data with respect to all of the text data. A generative MLM model can also utilize the deep learning techniques, including recurrent neural networks (RNNs), convolutional neural networks (CNNs), or transformer networks. Further details regarding generative MLMs are provided herein.

In some implementations, the generative MLM is trained to generate information for a user based only on the documents the user has access to (documents associated with a user account of the user), and not the other documents stored at the cloud-based data storage system or facts learned by the generative MLM from other sources. In some implementations, the generative MLM is trained to distinguish between different versions of a document and to account for recent activity with respect to the document (e.g., opening of the document, editing of the document, commenting on the document, resharing of the document, etc.) when determining which documents to use for providing the information for the user.

In some implementations, the cloud-based content management platform converts a user's query into a structured query so the platform can search for relevant documents in the cloud-based data storage system. This may be because the documents the user has access to at the cloud-based data storage is larger than what the generative MLM can efficiently process. In response to user queries, the generative MLM provides information with citations so that a user can verify the information. The information provided by the generative MLM can include links to documents in the cloud-based data storage system that support the content of the information. The information can include content in various forms such as text answers, lists of users that may have relevant information, folders or documents or other locations at the cloud-based storage system, calendar appointments, emails, or other data.

In some implementations, the cloud-based data storage system includes a document pre-processing subsystem that prepares the documents stored at the cloud-based data storage system for use by the generative MLM. Preparation of the documents can be important due to the large number of documents stored at the cloud-based data storage because such size would make it difficult, if not impossible, for a conventional MLM to use. The preparation may include inputting a document into an embedding model to generate a query embedding based on the document. The query embedding is a digital representation of the document. The preparation can also include inputting a portion of the document (e.g., a sentence, paragraph, or section of the document) into the embedding model to generate a query embedding for the portion of the document, and, similarly, the query embedding for the document portion is a digital representation of that document portion. The document pre-processing subsystem then associates these query embeddings with the document or the document portions. These embeddings are used by other portions or subsystems of the cloud-based content management platform to determine if a document or document portion is relevant to a user's actual query or predicted needs. For example, a user of the platform may submit a text prompt to the system, and the system may input the text prompt into the embedding model to obtain a query embedding for the text prompt. The text prompt's query embedding can be compared to the query embeddings associated with a document or portions of that document. If the text prompt's query embedding is sufficiently similar to a document's or a document portion's query embedding, then the platform can determine that the document or document portion is likely relevant to the user's text prompt.

The document pre-processing subsystem can cause the generative MLM to use a document of the cloud-based data storage system, or portions of the document, as input and generate generative MLM prompts about the document or the document portions (e.g., questions about the document or document portions, summaries of the document or document portions, etc.). The document pre-processing subsystem may then input these generated prompts into the embedding model to generate query embeddings that are digital representations of the prompts. The document pre-processing subsystem may then associate these prompts or prompt query embeddings with the document or the relevant document portions. As discussed above, the platform can use these query embeddings to determine if a document or a portion of the document is relevant to a user's text prompt or other user needs.

In some implementations, the cloud-based data storage system additionally or alternatively includes a personalized prompt subsystem that may provide personalized prompts to users of the cloud-based content management platform based on documents in the cloud storage. The platform may select multiple documents in the cloud storage based on a selection criterion (e.g., documents that have been recently created, viewed, or modified) and designate the selected documents as a "working set." The platform may then input a document or a portion of the document from the working set into the generative MLM, and the generative MLM may generate prompts based on the document, portions of the documents, multiple documents in the working set, or multiple document portions from different documents in the working set. Generated prompts may include queries such as, "What is new on the project?" "Summarize the documents in this folder," or "What needs my attention?"

In addition or alternatively, the cloud-based data storage system includes a real-time anticipation subsystem that, in real time, anticipates a user's interest in information contained in documents in the cloud-based content management platform's cloud storage. The platform may detect an action of a user at a user interface of the platform (e.g., text data input into a search bar or generative MLM prompt text field, a user right-clicking on a document, etc.), and perform an anticipatory assessment to predict what additional information the user may need based on the detected user action. Specifically, in some embodiments, the platform may select one or more documents in the cloud storage based on a selection criterion and designate the selected documents as a "working set." The platform may then use the action of the user and a document or portion of the document from the working set as input to the generative MLM, and the generative MLM may create, for presentation to the user, generative MLM prompts based on the action of the user and the document, portions of the documents, multiple documents in the working set, or multiple document portions from different documents in the working set, which are indicative of the user's additional information needs in relation to the detected action. For example, in response to (1) the user typing "passport" into a search bar of the user interface, and (2) an image of the user's passport being stored in the cloud storage, the generative MLM may create the generative MLM prompt, "Would you like to know when your passport expires?" and present this prompt on the user interface. In some implementations, the prompt is presented to the user immediately after (e.g., within a few (or a threshold number of) milliseconds of) the user's performing or requesting to perform the action while the user is still focused on the action.

In addition or alternatively, some implementations of the present disclosure may include a generative response subsystem that provides generative MLM response. Such responses can include citations to documents in the cloud storage of the cloud-based content management platform. Providing generative MLM responses may include obtaining a generative MLM prompt from a user. The generative response subsystem may process the prompt for intent or structured search terms, which may result in weighing different terms higher when searching for documents relevant to the prompt. The generative response subsystem can re-rank or refine the search results based on the searching user's permissions, a time threshold, a query embedding of the prompt as compared to a query embedding associated with a document or document portion, or other search criteria. The generative response subsystem may input the generative MLM prompt and the documents or document portions from the search results into the generative MLM to generate a generative MLM response to the user's prompt.

The response may include citations to the documents or document portions from the search results. These citations may allow the user to view the content that supports the generative MLM's response and verify the response or obtain further information. The generative response subsystem can analyze the generative MLM's response to verify that the response is consistent with the contents of the cited documents. Such verification can include comparing the content overlap of the text of the response and content of the cited documents, which may include using the query embeddings and other textual overlap methods.

Accordingly, aspects of the present disclosure provide a user of a cloud-based content management platform with verifiable responses to a prompt. A generative MLM processes the prompt and focuses on relevant and accessible documents in a user's cloud storage on the cloud-based content management platform. Existing MLM systems with chat interfaces can answer questions by drawing on an external body of knowledge that the MLM is trained on, but these MLMs are unable to provide answers with citations to a user's cloud storage on a cloud-based content management platform.

Furthermore, conventional information retrieval methods rely on conventional ranking algorithms to return ranked lists of content that may be relevant to a user's search, and the user should consume the search results to find information relevant to the user's interests. The present disclosure, on the other hand, provides a user with information synthesized from multiple cloud storage documents, and the information can contain links to specific portions of those documents that support the information.

In addition or alternatively, aspects of the present disclosure predict a user's interest in documents in the cloud storage and generate (preemptively or in real time) prompts for the user to execute using the generative MLM. As such, the efficiency of cloud-based content management platforms is increased, and user collaboration is expedited. In addition, by eliminating time-consuming user searching and reviewing of numerous documents and by using generative MLMs to perform tasks on the platform, the use of computer resources is improved, and memory consumption is reduced.

In addition, some benefits of the present disclosure may provide a technical effect caused by or resulting from a technical solution to a technical problem. For example, one technical problem may relate to significant use of network bandwidth and processing resources in the cloud-based content management environment when locating and loading documents for user review of documents in the cloud storage. Such locating and loading of documents in a conventional cloud-based content management environment may include many documents that the user has no interest in, resulting in wasteful use of resources. One of the technical solutions to the technical problem may include determining, using query embeddings from an embedding model, a smaller set of relevant documents, and generating responses to a user's prompts using a generative MLM. As a consequence, computing resources and network bandwidth required by unnecessary transfer of documents inside the cloud-based content management platform and downloads from server to client are reduced or eliminated.

FIG. 1 schematically depicts an example cloud-based content management platform 100 (the "platform 100") in which selected aspects of the present disclosure may be implemented, in accordance with various implementations. Any computing devices depicted in FIG. 1 or elsewhere in the figures may include logic such as one or more processing device (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems depicted in FIG. 1, such as a cloud content management system 110, may be implemented using one or more server computing devices that form what is sometimes referred to as a "cloud infrastructure," although this is not required.

In implementations, the platform 100 may include a cloud content management system 110 that implements a content management application that is accessible from various client devices, including clients 140-1, . . . , 140-*m* that may be included in the platform 100, through either a thin client interface, such as a web browser (e.g., a web-based cloud storage application), or a program interface. In implementations, the cloud storage application that is implemented by the cloud content management system 110 may be a software as a service (SaaS) cloud content management application. The cloud content management system 110 and the clients 140-1, . . . , 140-*m* may be in data communication via a computer network 150, which may be any suitable network including any combination of a local area network (LAN), wide area network (WAN), or the Internet. The cloud content management system 110 may include, among other things, a document pre-processing subsystem 112, a personalized prompt subsystem 114, a real-time anticipation subsystem 116, a generative response subsystem 118, and a generative MLM 120 to perform selected aspects of the present disclosure in order to enable more computationally efficient generation of responses for users of the platform 100. Additionally, the cloud content management system 110 may reduce usage of network bandwidth and processing resources in the platform 100 when locating and loading documents for user review of documents in cloud storage.

Each of the clients 140-1, . . . , 140-*m* may include, for example, a user computing device that is used by a user to access a cloud content management application via a cloud storage application user interface, such as a SaaS cloud storage application, that is provided by the cloud content management system 110, e.g., through a web browser. In an example, the clients 140-1, . . . , 140-*m* may include user computing devices associated with an individual or an entity or organization such as a business (e.g., financial institution, bank, etc.), non-profit, club, university, government agency, or any other organization that may use a cloud storage application. For example, a business may operate a cloud storage application to create, store, access, and/or modify one or more files to manage financial records, business records, client lists, and so forth.

In various implementations, the platform 100 may include cloud storage servers 130-1, . . . , 130-*n*. Files that are created, stored, accessed, and/or modified by one or more of the clients 140-1, . . . , 140-*m* using the cloud storage application that is implemented by the cloud content management system 110 may be stored in the cloud content management system 110 or in one or more of the cloud storage servers 130-1, . . . , 130-*n*. In some implementations, the cloud storage servers 130-1, . . . , 130-*n* along with the cloud content management system 110 may form a distributed storage system, and the cloud content management system 110 may create a plurality of data slices from a single file, and divide up the slices from the single file to be stored across different cloud storage servers 130-1, . . . , 130-*n*. Upon receipt of a request to access the file, the cloud content management system 110 may retrieve the slices from the cloud storage servers 130-1, . . . , 130-*n* and reassemble the file from the slices. In some implementations, the distributed storage system may provide a degree of redundancy and fault tolerance, such that fewer than all of the slices may be reassembled into the file. Accordingly, the risk of data loss may be minimized, even in a case where one of the cloud storage servers 130-1, . . . , 130-n has a failure or is otherwise inaccessible.

In some embodiments, a file may store a document. A document may store data or other information. Documents stored on the cloud storage servers 130-1, . . . , 130-n may store data or information in various formats. For example, a document may include a word processing document, a spreadsheet, a presentation, a portable document format (PDF) document, or other text data. A document may include calendar data, such as a calendar invite, an appointment, a meeting, or other calendar data. A document may include an email. A document may include an image, which may include additional data, such as content of the image in text form generated by optical character recognition (OCR). A document may include audio, which may include additional data such as text corresponding to a transcript of the audio data. A document may include a video, which may include additional data such a text corresponding to a transcript of the video.

In one or more implementations, a document may include one or more portions. A portion of a document (sometimes called a "document portion") may include content that is part of the document and that is less than the entirety of the document, or a document portion may include the entire contents of the document. For example, in a word processing document, a portion of the document may include a sentence, a paragraph, a page, a section, or another part of the word processing document. In a spreadsheet, a portion may include a row, a column, an individual cell, or other parts of the spreadsheet. In a presentation, a portion may include a slide, a text box, an image, or parts of the presentation. In a PDF, a portion may include a sentence, a paragraph, a page, a section, an image, a text box, or some other part of the PDF. A portion of calendar data may include a date, a time, a location, subject text data, a body of the calendar data, or other parts of the calendar data. A portion of an email may include a sender field, a recipient field, a subject line, an attachment (which may be its own document), a body of the email, a sentence, paragraph, or other part of the body, or other email data. A portion of an image may include a subsection of the image or other image data. A portion of audio may include a specific playback interval (e.g., the audio content between playback times 00:00:00 and 00:00:05), a portion of the text of the transcript, or other audio data. A portion of a video may include a specific playback interval (e.g., the video or audio content between playback times 01:30:00 and 01:31:15), a portion of the text of the transcript, or other video data. A portion of a document may include a comment associated with the document, where the comment may include text data or other data generated by a user of the platform 100.

A document may include metadata. The metadata may be stored in a metadata storage as part of the file of the document or may be stored in a separate part of the cloud storage servers 130-1, . . . , 130-n designated for document metadata. The metadata may include data indicating an owner of the document; permission data, which may indicate which users of the platform 100 may open, view, edit, or otherwise access the document; data indicating when the document was created, last opened, last modified, last commented upon, etc.; or other metadata.

Throughout this disclosure, referring to a document may refer to the contents of the document. Similarly, referring to a document portion may refer to the contents of that document portion. The contents of the document may include the data that comprises the body of the document. For example, the contents of a word processing document may include the text of the document. In some implementations, the contents of a document may not include the metadata of the document. For example, the system inputting a document portion into a generative MLM may include the system inputting the contents of that document portion into the generative MLM.

The document pre-processing subsystem 112 may include a subset or a component of the cloud content management system 110. The document pre-processing subsystem 112 may be configured to pre-process documents stored on the platform 100. Pre-processing a document may include generating one or more query embeddings based on the document or based on a portion of the document. The query embeddings may be used by other components of the cloud content management system 110 to provide generative information to a user of the platform 100.

The personalized prompt subsystem 114 may also include a subset or a component of the cloud content management system 110. The personalized prompt subsystem 114 may be configured to generate generative MLM prompts personalized to one or more users of the platform 100. Generating the personalized generative MLM prompts may be based on documents stored on the platform 100 to which a user has access or documents that the user has recently viewed, edited, or otherwise accessed, or may be based on documents selected using some other selection criteria. The cloud content management system 110 may provide the personalized generative MLM prompts to the user on a user interface displayed on the user's client 140-1 so the user can submit the generative MLM query to the generative MLM 120 and receive information from the platform 100.

The real-time anticipation subsystem 116 may also include a subset or a component of the cloud content management system 110. The real-time anticipation subsystem 116 may be configured to predict, in real-time, a user's interests and generate generative MLM prompts based on those interests. The real-time anticipation subsystem 116 may predict the interests based on action of a user regarding the platform 100 (e.g., inputting text into a user interface, right-clicking on a document, etc.). The cloud content management system 110 may provide the generative MLM prompts to the user on a user interface displayed on the user's client 140-1 so the user can submit the generative MLM query to the generative MLM 120 and receive information from the platform 100.

The generative response subsystem 118 may include a subset or a component of the cloud content management system 110. The generative response subsystem 118 may be configured to accept user input from a user of the platform 100 in the form of a generative MLM prompt and utilize embedding models and generative MLM 120s to generate a response to the user's prompt. The generative response subsystem 118 may input one or more documents or document portions or query embeddings as context into the generative MLM 120 in order to generate the response. The response may include citations to documents or document portions in the cloud storage that the generative MLM 120 used to generate the response.

The generative MLM 120 may include an artificial neural network. Artificial neural networks generally include a feature representation component with a classifier or regression layers that map features to a target output space. A CNN, for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g., classification outputs). The neural network may be a deep network with multiple hidden layers or a shallow network with zero or a few (e.g., 1-2) hidden layers. Deep learning is a class of machine learning algorithms that use a cascade of multiple layers of nonlinear processing units for feature extraction and transformation. Each successive layer uses the output from the previous layer as input. Neural networks may learn in a supervised (e.g., classification) and/or unsupervised (e.g., pattern analysis) manner. Some neural networks (e.g., such as deep neural networks) include a hierarchy of layers, where the different layers learn different levels of representations that correspond to different levels of abstraction. In deep learning, each level learns to transform its input data into a slightly more abstract and composite representation.

In some embodiments, the generative MLM 120 may be one or more RNNs. An RNN is a type of neural network that includes a memory to enable the neural network to capture temporal dependencies. An RNN is able to learn input-output mappings that depend on both a current input and past inputs. The RNN will address past and future measurements and make predictions based on this continuous measurement information. One type of RNN that may be used is a long short term memory (LSTM) neural network.

The generative MLM 120 may include a machine learning model configured to accept an input and generate an output by repeatedly predicting the next word in the output based on the input and the current output. In some embodiments, the generative MLM 120 may be based on or include one or more deep learning machine learning models. One or more of those deep learning models may include a transformer-based large language model (LLM), which may include one or more transformer models. A transformer may have been pretrained using self-supervised learning, semi-supervised learning, or unsupervised training. The pretraining may be followed by supervised fine-tuning. The training may include using a dataset that may include text data in order to train the transformer on what words, phrases, or other text data follow certain words or phrases. The transformer may include an attention mechanism configured to determine which parts of the input should be weighed more and to which other parts of the input a certain word relates. The cloud content management system 110 may include one or more generative MLMs 120, which may include different generative LLMs or different instances of the same generative LLM.

In some embodiments, the generative MLM 120 may accept, as input, a generative MLM prompt. The generative MLM prompt may include text or other data. A user may generate the generative MLM prompt using user interface components, such as a text input field. The generative MLM 120 may accept, as input, context. Context may include text or other data that may be separate from the user input and is used in generating the generative MLM 120's output. In some embodiments, the generative MLM prompt may explicitly include context. In some embodiments, the generative MLM 120 may receive the context separately from the generative MLM prompt and may synthesize the generative MLM prompt and the context into an input format that a transformer of the generative MLM 120 can use. The output of the generative MLM 120 may include text data or other data, and the output is sometimes referred to as a "response" or "generative MLM response."

As an example, a generative MLM prompt may include the text input, "Summarize the Sales-Report-7 file" where "Sales-Report-7" is a file on the cloud-based content management platform 100. The generative MLM 120 may use the generative MLM prompt as input and may use the contents of the "Sales-Report-7" file as context. The generative MLM 120 may synthesize the generative MLM prompt and context into an input for a transformer of the generative MLM 120. The generative MLM 120 may process the input by executing the transformer and other machine learning models and components to predict based on their training, the next word or phrase in the generative MLM 120's response.

The platform 100 may prepare documents in the cloud storage of the platform 100 for use in providing generative answers. This preparation may include an embedding model generating (1) embeddings based on a document, (2) embeddings based on a portion of the document, or (3) embeddings based on prompts generated by the cloud content management system 110 about the document or document portions. The cloud content management system 110 may use these embeddings to compare to embeddings of other data, such as prompts input by a user, in order for the cloud content management system 110 to determine if that other data is similar to the documents or document portions stored in the cloud storage.

FIG. 2 is a flowchart illustrating an example method 200 of pre-processing documents in cloud storage using query embeddings, in accordance with implementations disclosed herein. For convenience, the operations of the flowchart are described with reference to a system that performs the operations. This system may include various components of various computer systems, such as the document pre-processing subsystem 112 or one or more other components of the cloud content management system 110. Moreover, while operations of method 200 are shown in a particular order, this is not meant to be limiting. One or more operations may be reordered, omitted, or added.

At block 210, the document pre-processing subsystem 112 may select a portion of a document stored in the cloud-based content management platform 100. The selected document portion may be the entire document. The selected document portion may be an answer-sized portion of the document. In some embodiments, the document pre-processing subsystem 112 may iteratively select each document portion of a document and perform the method 200 on the selected document portion.

At block 220, the document pre-processing subsystem 112 may input a set of example statement-prompt pairs into a generative MLM 120. The set of example statement-prompt pairs may include a generative MLM prompt configured to generate one or more other generative MLM prompts about the document portion selected in block 210. The set of example statement-prompt pairs may include a few-shot prompt, which may include multiple example statements that may be similar in length or style to the document portion selected in block 210. The few-shot prompt may include one or more example prompts, and each example prompt may be associated with one of the example statements. In some embodiments, the example statements and corresponding example prompts may help provide context for the generative MLM when generating responses.

In one embodiment, the few-shot prompt may be in the format of:
Statement: [first example statement]
Prompt: [first example prompt about the first statement]
Statement: [second example statement]

Prompt: [second example prompt about the second statement]
Statement: [document portion selected in block 210]
Prompt:

The last "Prompt" in the few-shot prompt may indicate to the generative MLM 120 that the generative MLM 120 is being prompted to follow the first and second examples and generate a prompt about the document portion selected in block 210.

An example few-shot prompt may include:

Statement: A cat is a four-legged, carnivorous mammal. It belongs to the family Felidae and is often kept as a house pet. Cats catch and eat mice, rats, birds, and other small animals. Cats do not make much noise other than by purring and occasionally meowing.
Prompt: What is a cat?
Statement: The file must contain between 256 kB and 4 MB of data. Valid file extensions for the file include .txt, .pdf, and .nrt. The file can be stored either in the "Locations" folder or the "Miscellaneous" folder. Multiple files can be accepted.
Prompt: Tell me about the constraints on the file configuration.
Statement: The meeting originally scheduled for Wednesday morning has been rescheduled to Thursday afternoon to better fit with everyone's schedules. We will be discussing upcoming deadlines and assigning employees to various projects. Please submit any edits to the timeline before Thursday at 12 p.m.
Prompt:

In one embodiment, the set of example statement-prompt pairs may further include a context portion. The context portion may provide context to the document portion selected in block 210. The context portion may include a document portion that appears before or after the selected document portion in the document. The context portion may include a predetermined number of lines of text that appears before or after the selected document portion in the document (e.g., the previous 20 lines of text). The context portion may include some other data that may provide context to the document portion selected in block 210. In one embodiment, the context portion may be indicated in the few-shot prompt in the form of the text "Context:" followed by the context portion.

In one or more embodiments, at block 220, the document pre-processing subsystem 112 may input a single-shot prompt into the generative MLM 120. The single-shot prompt may include a single example statement and a single example prompt, in addition to the selected document portion of block 210. In some embodiments, a single-shot prompt may be less computationally intensive to process than a few-shot prompt, or the document pre-processing subsystem 112 may have fewer example statements or prompts, and thus, may use a single-shot prompt instead of a few-shot prompt. In some embodiments, at block 220, the document pre-processing subsystem 112 may input a no-shot prompt into the generative MLM 120. The no-shot prompt may include no example statements or example prompts. The no-shot prompt may include a command to generate a generative MLM prompt about the selected document portion.

At block 230, the document pre-processing subsystem 112 may obtain an output from the generative MLM 120. The output may include a generative MLM prompt associated with the portion of the document. The generative MLM 120 may use the one or more example statements, the one or more example prompts, and the selected document portion of block 210 as context; use other portions of the input as a generative MLM prompt; synthesize these inputs into a format for the generative MLM 120 and other machine learning models and components, and input them into the generative MLM 120 and other machine learning models and components in order for the generative MLM 120 to generate the predicted text as the response in the form of a generative MLM prompt. For example, responsive to the few-shot prompt in the previous example, above, the generative MLM 120 may generate the generative MLM prompt, "What time is the meeting on Wednesday?", "Help me prepare for my upcoming Thursday meeting," or "When do I need to submit my timeline edits?"

At block 240, the document pre-processing subsystem 112 may generate, using an embedding model, a query embedding based on the generative MLM prompt generated at block 230. The embedding model may include a piece of software or hardware that accepts a piece of data as an input and generates a query embedding as an output. The query embedding may include a data representation of the input, e.g., in the case of block 240, the generative MLM prompt. The embedding model produces similar query embeddings for similar inputs. The similarity of two or more query embeddings can be determined using various methods. The query embedding may include a vector. The vector may include multiple floats. It should be noted that while the term "query embedding" is used herein, this should not be interpreted as restricting a query embedding to only be associated with a query, generative MLM prompt, etc. The term "query embedding" may refer to an embedding associated with other data, such as an embedding generated based on a document. The document pre-processing subsystem 112 may use the query embedding to determine whether the generative MLM prompt is semantically similar to another piece of content, which may include a document portion, a document, or multiple documents in the cloud storage.

In some embodiments, the document pre-processing subsystem 112 may perform a compression operation on the vector. In some embodiments, the vector may include a large number of floats (e.g., hundreds or thousands of floats). The document pre-processing subsystem 112 may compress the vector to reduce the number of floats or otherwise reduce the size of the vector. The document pre-processing subsystem 112 may use fewer computing resources when processing or storing a compressed vector versus the uncompressed vector.

At block 250, the document pre-processing subsystem 112 may store an association of the query embedding with the portion of the document selected in block 210. The association may be subsequently used by the generative MLM 120 to provide information related to content of the documents to users of the platform 100. The document pre-processing subsystem 112 associating the query embedding with the document portion may include creating a logical link on the platform 100 between the query embedding and the document portion. The document pre-processing subsystem 112 storing the association may include storing the query embedding in metadata associated with the document portion or the document containing the document portion. In one embodiment, as part of block 250, the document pre-processing subsystem 112 may associate the query embedding with the document that contains the document portion. The query embeddings associated with the document portion or the document may allow a component of the cloud content management system 110 to determine whether a generative MLM prompt, another document portion, or another document is similar to the document portion selected in block 210. For example, the generative response subsystem 118 may receive a generative MLM prompt and may input that prompt into the embedding model to generate another query embedding. The generative response subsystem 118 may compare the query embedding of the newly inputted generative MLM prompt to the query embedding generated at block 240. If the two query embeddings are within a certain distance threshold, then the generative response subsystem 118 determines that the generative MLM prompt and the document portion are similar and, thus, the document portion may assist in generating a generative MLM response to the generative MLM prompt.

In some implementations, the subsequent use by the generative MLM may include the generative response subsystem 118 selecting the portion of the document based on a similarity between the query embedding generated in block 240 and a query embedding of a user input to the platform 100. The generative response subsystem 118 may then input the portion of the document into the generative MLM 120 and generate, using the generative MLM 120, a generative MLM response that includes a citation to the document portion, as discussed further below.

In one embodiment, the method 200 may further include inputting the document that contains the document portion selected in block 210 into the embedding model. The embedding model may generate a query embedding, and the document pre-processing subsystem 112 may store an association of this query embedding with the document. Inputting the document into the embedding model may include inputting the entire document or a subset of the document. The subset of the document may include a threshold number of document portions, a threshold number of pages (e.g., the first five pages of the document), a document portion that the document pre-processing subsystem 112 has determined is a representative portion of the document, or some other subset of the document.

In some embodiments, the method 200 may further include grouping the document portion selected in block 210 and the generative MLM prompt generated in block 230 into a statement-prompt pair. The document pre-processing subsystem 112 may then be able to use this statement-prompt pair in a future set of example statement-prompt pairs. The platform 100 may include a statement-prompt library that may include multiple example statement-prompt pairs. The document pre-processing subsystem 112, at block 220 may select one or more of the example statement-prompt pairs in the statement-prompt library to use to generate a few-shot prompt, a one-shot prompt, or some other generative MLM prompt. Thus, the platform 100 may increase the number of examples that the document pre-processing subsystem 112 can use to generate example statements and prompts, which may improve the accuracy and performance of the platform 100.

In some embodiments, the document pre-processing subsystem 112 may execute the method 200 in response to a document being created in or uploaded to the platform 100 or in response to the document being modified while on the platform 100. For example, responsive to a document being created, uploaded, or modified, the document pre-processing subsystem 112 may place the document in a queue, and the document pre-processing subsystem 112 may execute the method 200 on each document in the queue. In one embodiment, the document pre-processing subsystem 112 may execute the method 200 in response to a document portion being created or modified. In some embodiments, the document pre-processing subsystem 112 may asynchronously execute the method 200, which may include the document pre-processing subsystem 112 executing the method 200 not responsive to the document or document portion being created, modified, or uploaded. In some embodiments, in order to reduce use of computational resources, the document pre-processing subsystem 112 may wait to prepare documents with some query embeddings until the document is needed in order to respond to a prompt or other query.

The document pre-processing subsystem 112 may repeatedly execute the method 200 and may select the same document portion in block 210 in each execution. This repeated execution on the same document portion may allow the document pre-processing subsystem 112 to generate multiple different generative MLM prompts for the same document portion. In some embodiments, during a repeated execution of the method 200, the document pre-processing subsystem 112 may use different example statements and prompts at block 220.

FIG. 3 is a flowchart illustrating an example method 300 of pre-processing documents in cloud storage using query embeddings, in accordance with implementations disclosed herein. For convenience, the operations of the flowchart are described with reference to a system that performs the operations. This system may include various components of various computer systems, such as the document pre-processing subsystem 112. Moreover, while operations of method 300 are shown in a particular order, this is not meant to be limiting. One or more operations may be reordered, omitted, or added.

At block 310, the document pre-processing subsystem 112 may select a document stored in the cloud-based content management platform 100. The document may include one or more document portions. Selecting the document may be based on a user query input into the platform 100. For example, the document pre-processing subsystem 112 may select the document in response to determining the document is relevant to the user query.

At block 320, for each document portion of the one or more document portions of the document determined in block 310, the document pre-processing subsystem 112 may execute blocks 322-328. At block 322, the document pre-processing subsystem 112 may input a set of statement-prompt pairs and the document portion into a generative MLM 120. Block 322 may include similar functionality to block 220 of FIG. 2.

At block 324, the document pre-processing subsystem 112 may generate, using the generative MLM 120, a generative MLM prompt associated with the document portion. Block 324 may include similar functionality to block 230 of FIG. 2. At block 326, the document pre-processing subsystem 112 may generate, via an embedding model, a query embedding based on the generative MLM prompt. Block 326 may include similar functionality to block 240 of FIG. 2. At block 328, the document pre-processing subsystem 112 may store an association of the query embedding with the document portion for subsequent use by the generative MLM 120 to provide a response to the user query. Block 328 may include similar functionality to block 250 of FIG. 2.

In some embodiments, the document pre-processing subsystem 112 may store the query embeddings generated in each iteration of block 326 on the cloud content management system 110. This may include storing the query embeddings in a memory of the cloud content management system 110. The cloud content management system 110 may periodically determine a completion status of the user query of the block 310. Responsive to the cloud content management system 110 determining that the user query of the block 310 has been completed, the cloud content management system

110 may free the portion of the memory that stores the one or more query embeddings generated in the iterations of block 326. Storing the query embeddings for the various document portions may consume cloud content management system 110 memory or data storage space (e.g., the cloud storage servers 130-1, . . . , 130-n). In order to reduce memory and storage space usage, the document pre-processing subsystem 112 may generate the query embeddings temporarily in response to a user query, and the document pre-processing subsystem 112 may free the memory or storage space after the document pre-processing subsystem 112 has used the query embeddings to respond to the user query.

As an example, a user of the platform 100 may input, into a user interface of the platform 100, a user query that includes the generative MLM prompt, "Prepare me for my upcoming meeting." At the time the user inputs the user query, the document pre-processing subsystem 112 may not have generated query embeddings for one or more document portions that are used to generate a response to the user query. The document pre-processing subsystem 112 may execute the method 300 to generate a generative MLM response to the user query, and part of executing the method 300 may include generating the query embeddings at block 326. After the document pre-processing subsystem 112 generates the response and presents the response to the user, the query embeddings may no longer be needed, and the cloud content management system 110 may free the memory or data storage space storing the query embeddings. In some embodiments, the cloud content management system 110 may not free the memory or data storage space occupied by the query embeddings and, instead, may store the query embeddings in data storage for future use.

FIG. 4 is a flowchart illustrating an example method 400 of pre-processing documents in cloud storage using query embeddings, in accordance with implementations disclosed herein. For convenience, the operations of the flowchart are described with reference to a system that performs the operations. This system may include various components of various computer systems, such as the document pre-processing subsystem 112. Moreover, while operations of method 400 are shown in a particular order, this is not meant to be limiting. One or more operations may be reordered, omitted, or added.

In block 410, the document pre-processing subsystem 112 may select a portion of a document stored in the cloud-based content management platform 100. Block 410 may include similar functionality to block 210 of FIG. 2. In block 420, the document pre-processing subsystem 112 may generate, using a generative MLM 120, a generative MLM prompt associated with the portion of the document selected in block 410. The generative MLM may generate the generative MLM prompt responsive to an input generative MLM prompt and the selected portion of the document. The input generative MLM prompt may include a no-shot prompt, an example statement-prompt pair (e.g., a one-shot prompt), or a set of example statement-prompt pairs (e.g., a few-shot prompt). Block 420 may include similar functionality to block 230 of FIG. 2. At block 430, the document pre-processing subsystem 112 may generate, using an embedding model, a query embedding based on the generative MLM prompt generated in block 420. Block 430 may include similar functionality to block 240 of FIG. 2. At block 440, the document pre-processing subsystem 112 may store an association of the embedding generated in block 430 with the portion of the document selected in block 410 for subsequent use by the generative MLM 120 to provide information related to content of the document to users of the platform 100. Block 440 may include similar functionality to block 250 of FIG. 2.

By processing and preparing documents stored by the platform 100 as discussed herein, the documents may be ready to be used by a generative MLM 120 to provide generative answers, provide personalized generative MLM prompts to users based on the documents, or provide real-time generative MLM prompt suggestions based on the documents. For example, the query embeddings associated with the documents or document portions generated by methods 200, 300, or 400 may be used to determine what documents of the platform 100 are relevant to a user's generative MLM prompt. The relevant documents may be input into a generative MLM 120 to provide a generative MLM response or to generate generative MLM prompts that a user may find helpful.

FIG. 5 is a flowchart illustrating an example method 500 of providing generative answers, including citations to source documents, in accordance with implementations disclosed herein. For convenience, the operations of the flowchart are described with reference to a system that performs the operations. This system may include various components of various computer systems, such as the generative response subsystem 118. Moreover, while operations of method 500 are shown in a particular order, this is not meant to be limiting. One or more operations may be reordered, omitted, or added.

At block 510, the generative response subsystem 118 may obtain a generative MLM prompt from a user interface. The user interface may include a user interface of the platform 100. The user interface may include a user interface displayed on a client 140-1. The generative response subsystem 118 may obtain the generative MLM prompt over the computer network 150.

In one implementation, the generative MLM prompt may include text data. For example, the generative MLM prompt may be, "What is the maximum file size you can upload to the website?" The generative MLM prompt may include a reference to a user of the platform 100. For example, the generative MLM prompt may be, "What is jsmith182 working on today?" Where "jsmith182" is a username of a user of the platform 100. The generative MLM prompt may include a reference to a document, folder, or file on the platform 100. For example, the generative MLM prompt may be "What is a key insight of /Docs/SalesReports/?" where "/Docs/SalesReports" is a reference to a folder stored on the platform 100. The generative MLM prompt may be "Summarize Sales-Report-7" where "Sales-Report-7" is a document stored on the platform 100. In some embodiments, a reference to a document, folder, or file on the platform 100 may include a uniform resource locator (URL), uniform resource identifier (URI), a file system path, or some other data that may identify a location in the platform 100.

At block 520, the generative response subsystem 118 may generate, using an embedding model, a first query embedding based on the generative MLM prompt. The query embedding may include a data representation of the generative MLM prompt. The query embedding may include a vector, which may include multiple floats and may be compressible. The embedding model may be the same embedding model as, or may be another instance of the same embedding model as, the embedding model of block 240 of the method 200.

At block 530, the generative response subsystem 118 may select, multiple documents stored on the cloud-based content management platform 100, a subset of the multiple documents. The generative response subsystem's 118 selection at block 530 may include various steps that reduce, refine, or re-rank the multiple documents stored on the platform 100 in order to arrive at a subset of the documents that is workable by the generative MLM 120 and that is relevant to the generative MLM prompt.

In one embodiment, at block 530, the generative response subsystem 118 may input the generative MLM prompt into a search term-generating generative MHLM. The search term-generating MLM may include a generative MLM 120 of the cloud content management system 110. The search term-generating generative MLM may include a generative MLM that has been trained and configured to generate search terms that the generative response subsystem 118 can use to search the documents of the platform 100 for documents relevant to the search terms. The search term-generating generative MLM may generate a response with one or more search terms.

In some embodiments, the search term-generating generative MLM may generate a response with one or more synonyms of a term or similar terms to a term in the generative MLM prompt. For example, in response to the generative MLM prompt including the word "cat," the search term-generating generative MLM's response may include words such as "cat," "feline," or "kitten." In certain embodiments, the search term-generating generative MLM may generate a response with a word stem of a word in the generative MLM prompt. For example, in response to the generative MLM prompt including the word "publication," the search term-generating generative MLM's response may include words such as "publish," "public," "publicize," or "publisher." In some embodiments, the search term-generating generative MLM may generate a response in a Boolean search format. For example, in response to the generative MLM prompt being, "What documents should I review for my upcoming meeting?", the search term-generating generative MLM may generate a response such as "(document OR file) AND (review OR analyze) AND [after:2023-09-01] AND [before:2023-09-14]" where the current date is Sep. 1, 2023.

The generative response subsystem 118 may input data into the search term functionality of the cloud content management system 110 to weigh certain search terms as more important than other search terms. For example, the generative response subsystem 118 may indicate that certain common words (e.g., "the," "of," "a," "an," "be," "to," "in," etc.) should receive less weight than other word in the search terms. The generative response subsystem 118 may input the generative MLM prompt or search terms into a search term-weighing generative MLM, which may include a generative MLM 120 of the cloud content management system 110 trained and configured to determine which words in a search query are important. The output of the search term-weighing generative MLM may include data indicating which words of the search terms are important and their relevant weights.

The generative response subsystem 118 may then perform a keyword search on the one or more documents stored on the platform 100, and the search may be based on the search terms generated by the search term-generating generative MLM, the search term-weighing generative MLM, or other search components of the cloud content management system 110. The keyword search may select a subset of the documents stored on the platform 100. The generative response subsystem 118 may rank the documents in the subset such that more relevant documents are listed before less relevant documents.

In one embodiment, the generative response subsystem 118 may rank a document higher or lower based on a timestamp associated with the document. For example, the metadata associated with the document may include a timestamp of the last time the document was opened, modified, commented on, or created. Documents with a more recent timestamp may be ranked higher than a document with a later timestamp. In some embodiments, in response to a document's timestamp not being within a threshold time range, the cloud content management system 110 may not include the document in the subset.

The generative response subsystem 118 may rank a document higher or lower based on a query embedding associated with the document. A query embedding associated with a document may include a query embedding generated during the preparation process for the document (e.g., during the method 200 of FIG. 2, the method 300 of FIG. 3, the method 400 of FIG. 4). A query embedding associated with a document may include a query embedding of a generative MLM prompt generated during the method 900 of FIG. 9 or the method 1100 of FIG. 11, discussed below. A query embedding associated with a document may include a query embedding generated using some other process. In some implementations, the metadata associated with the document may include a query embedding based on the document or one or more query embeddings based on the one or more document portions contained in the document. Documents with query embeddings that are more similar to the query embedding of the generative MLM prompt of block 510 may be ranked higher than a document with less similar query embeddings. In response to a document's query embedding(s) not being within a threshold similarity to the generative MLM's prompt's query embedding, the generative response subsystem 118 may not include the document in the subset.

In one embodiment, a document may include metadata that indicates whether a certain user or group of users has permission to open, edit, or perform other actions related to the document. In response to the user that submitted the generative MLM prompt not having permission to open, edit, or perform another action related to the document (as indicated by the permissions metadata), the cloud content management system 110 may not include the document in the subset.

The various searching, refining, and ranking functionality discussed above in relation to block 530 may occur in different orders. For example, the generative response subsystem 118 may first determine a subset of documents that the user has permission to view or edit, based on the permissions metadata of each document. Second, the generative response subsystem 118 may refine the subset based on the timestamps of the documents that indicate the last time a document was opened, modified, etc. such that only documents with a timestamp within the last week are included in the subset. Third, the generative response subsystem 118 may perform a keyword search on the refined subset of documents based on the user's generative MLM prompt to further refine the subset. Fourth, the generative response subsystem 118 may re-rank the documents in the further subset based on the similarity between a query embedding associated with a document and the query embedding of the generative MLM prompt. Other orders of these various functions are contemplated within the scope of the disclosure.

Although the above discussion includes the generative response subsystem 118 performing the keyword searching, ranking, and other functionality, such actions may, in some cases, be performed by other components of the cloud content management system 110. The other components may include the document pre-processing subsystem 112, the personalized prompt subsystem 114, the real-time anticipation subsystem 116, or another component of the cloud content management system 110 specifically configured to perform such searching and ranking actions (e.g., a document searching subsystem (not shown in FIG. 1)).

At block 540, the generative response subsystem 118 may input the generative MLM prompt and the subset of the one or more of documents into a generative MLM 120. The generative MLM 120 may be a different generative MLM 120 than the search term-generating generative MLM or the search term-weighing generative MLM of block 530. The generative MLM 120 of block 540 may include a generative MLM trained and configured to generate a response to the generative MLM prompt of block 510 based on the subset selected in block 530. The generative MLM 120 may use the contents of the subset as context for the generative MLM 120.

In some embodiments, using the contents of the subset as context may include using one or more document portions of the one or more documents of the subset as context. In some contexts, using the entire contents of a document or multiple documents in the subset may be computationally intensive or may use a large amount of memory or other storage. Thus, in some embodiments, the generative MLM 120 may use one or more document portions of the subset as context for the generative MLM 120. In some embodiments, the generative response subsystem 118 may select the one or more document portions of the subset based on various criteria, such as a document portion's associated query embedding being within a threshold similarity to the generative MLM prompt, or some other criteria.

At block 550, the generative response subsystem 118 may generate, using the generative MLM 120, a generative MLM response. The generative MLM 120 may use the generative MLM prompt as a prompt and the subset of one or more documents as context, synthesize these inputs into a format for a transformer of the generative MLM 120 and other machine learning models and components, and input them into the transformer and other machine learning models and components in order for the generative MLM 120 to generate the predicted text as the generative MLM response.

In some embodiments, the response generated by the generative MLM 120 may include one or more citations to one or more documents of the subset. The citation may allow a user to view the content that supports the generative MLM response, verify the generative MLM response, or obtain further information. A citation may include a link to a document in the subset. The linked document may include the document providing support for the generative MLM response. The link may include a URL, URI, a file system path, or some other data that can identify the location of the linked document. The link may allow a user to interact with the link and open the referenced document on a user interface (e.g., a user interface of a client 140-1). In some embodiments, a citation to the one or more documents of the subset may include a citation to one or more specific document portions of the one or more documents. In such an embodiment, the link to a document may include a link to the specific document portion.

The method 500 may further include providing, on a user interface of the platform 100, the generative MLM response generated in block 550. The generative MLM response may include a highlighting of a portion of the generative MLM response. In some embodiments, the generative response subsystem 118 may include, in the generative MLM response, data that may indicate to the user interface to highlight certain portions of the generative MLM response. In response to processing this data, the user interface may highlight the portion of the generative MLM response as indicated by the data. The highlighting may assist a user in quickly determining which parts of the generative MLM response are supported by the document in the subset.

In some embodiments, the user interface may use different colors or other visual indications in its highlighting to indicate that different parts of the generative MLM response are supported by different documents in the subset or different document portions. For example, the first sentence of the generative MLM response may be supported by Document A, and the user interface may highlight the first sentence in blue. The second sentence of the generative MLM response may be supported by Document B, and the user interface may highlight the second sentence in yellow. These different colors for the different sentences may quickly signal to a user that these sentences are supported by different documents.

In some embodiments, responsive to the generative MLM response generated in block 550 having a link to a supporting document, and in response to a user interacting with the link, the user interface may open the supporting document in the user interface and highlight the document portion in the document that supports the generative MLM response. For example, the generative MLM response may include a link to Document A because a paragraph in Document A supports the generative MLM response. A user may click on the link, and the user interface may open Document A in another browser tab, browser window, software application window, or other user interface area. The user interface may highlight the paragraph in Document A that supports the generative MLM response. The highlighting may allow the user to quickly locate the portion of Document A that supports the generative MLM response so the user can verify the contents of the generative MLM response or obtain further information from the source document. In another implementation, a middle portion of an image in Document C may support the generative MLM response, and the user interface may position a box around the middle portion to quickly signal to a user that this portion of the image supports the response.

The method 500 may further include obtaining a second generative MLM prompt from the user interface. The second generative MLM prompt may include a follow-up query from the user after obtaining the generative MLM response in block 550. The follow-up query may include a follow-up question about the content of the generative MLM response generated in block 550, a request for more information similar to the generative MLM response, or some other query. The generative response subsystem 118 may input the second generative MLM prompt into the generative MLM 120. The generative response subsystem 118 may input the subset of documents selected in block 530 and the generative MLM response generated in block 550 as context for the generative MLM. The generative response subsystem 118 may determine that a different subset of documents is needed to respond to the follow-up query and, thus, may select a different subset of documents. The generative MLM 120 may use these inputs to generate another generative MLM response to the follow-up query.

FIG. 6 is a flowchart illustrating an example method 600 of providing generative answers, including citations to source documents, in accordance with implementations disclosed herein. For convenience, the operations of the flowchart are described with reference to a system that performs the operations. This system may include various components of various computer systems, such as the generative response subsystem 118. Moreover, while operations of method 600 are shown in a particular order, this is not meant to be limiting. One or more operations may be reordered, omitted, or added.

At block 610, the generative response subsystem 118 may obtain a generative MLM prompt from a user interface. Block 610 may include similar functionality to block 510 of FIG. 5. At block 620, the generative response sub system 118 may input the generative MLM prompt from block 610 and one or more documents into a generative MLM 120. The one or more documents may include documents stored on the cloud-based content management platform 100. One or more of the documents may include one or more document portions, and one or more of these document portion may include an associated query embedding. In some embodiments, block 620 may include similar functionality to block 540 of FIG. 5.

At block 630, the generative response subsystem 118 may generate, using the generative MLM 120, a generative MLM response. Block 630 may include functionality similar to block 550 of the FIG. 5. At block 640, the generative response subsystem 118 may generate, using an embedding model, a query embedding based on the response generated in block 630. The embedding model may be the same embedding model as, or may be another instance of the same embedding model as, the embedding model of block 240 of the method 200.

At block 650, the generative response subsystem 118 may select a subset of the one or more document portions of block 620 where the query embedding of each document portion in this subset is within a threshold similarity from the query embedding generated in block 640. Thus, the generative response subsystem 118 may select document portions that may be semantically similar to the generative MLM response. At block 660, the generative response subsystem 118 may include one or more citations to one or more document portions of the subset in the generative MLM response generated at block 630. Block 660 may include similar functionality to block 550 of FIG. 5 regarding citations to documents or document portions.

FIG. 7 is a flowchart illustrating an example method 700 of providing generative answers, including citations to source documents, in accordance with implementations disclosed herein. For convenience, the operations of the flowchart are described with reference to a system that performs the operations. This system may include various components of various computer systems, such as the generative response subsystem 118. Moreover, while operations of method 700 are shown in a particular order, this is not meant to be limiting. One or more operations may be reordered, omitted, or added.

At block 710, the generative response subsystem 118 may generate, using an embedding model, a query embedding based on a generative MLM prompt. Block 710 may include functionality similar to block 520 of FIG. 5. At block 720, the generative response subsystem 118 may select, from multiple documents stored in the cloud-based content management platform 100, a subset of the multiple documents. One or more documents in the subset may include an associated query embedding. The selection of the subset may be based on the query embedding of the generative MLM prompt of block 710 being within a threshold similarity from a query embedding associated with a document of the multiple documents. Block 720 may include functionality similar to block 530 of FIG. 5. At block 730, the generative response subsystem 118 may select, from the subset of documents of block 720, a second subset of documents. The selection of the second subset may be based on an access permission of a document in the first subset of documents. Block 730 may include functionality similar to block 530 of FIG. 5.

At block 740, the generative response subsystem 118 may input the generative MLM prompt from block 710 and the second subset of documents from block 730 into a generative MLM 120. Block 740 may include functionality similar to block 540 of FIG. 5. At block 750, the generative response subsystem 118 may generate, using the generative MLM, a generative MLM response. Block 750 may include functionality similar to block 550 of FIG. 5.

In some embodiments, a document from the first subset of documents in block 720, or from the second subset of documents in block 730, may include one or more document portions. A document portion of the one or more document portions may include an associated query embedding. An embedding model—which may be the same embedding model as, or may be another instance of the same embedding model as, the embedding model of block 710—may have generated the query embedding associated with the document portion. The method 700 may further include the generative response subsystem 118 selecting, from the one or more documents, a subset of document portions. The generative response subsystem's 118 selection of this subset of document portions may be based on the query embedding of block 710 being within a threshold similarity from a query embedding of a document portion in the subset of document portions. In some embodiments, block 740 may include the generative response subsystem 118 inputting the generative MLM prompt of block 710 and the subset of document portions into the generative MLM 120. The generative MLM 120 may then generate the generative MLM response in block 750 based on these inputs.

The generative response subsystem 118 may generate, via an embedding model (e.g., the embedding model of, or instance of the embedding model of, block 710), a query embedding based on the generative MLM response generated in block 750. The generative response subsystem 118 may determine whether the query embedding based on the generative MLM response is within a threshold similarity to a query embedding of a document of the multiple documents, or is within a threshold similarity to a query embedding of a document portion of the subset of document portions. Responsive to the generative response subsystem's 118 determination that the query embedding based on the generative MLM response is not within the threshold similarity of any embedding of the one or more documents or the subset of document portions, the generative response subsystem 118 may reject the generative MLM response. This functionality may provide an automatic verification of the generative MLM response. If the generative MLM response is not similar to any of the relevant documents selected by the generative response subsystem 118 during the selection, re-ranking, or refining process, or similar to any of the document portions, then the generative MLM response may not be of sufficient quality or relevancy, and thus, the generative response subsystem 118 may reject the generative MLM response. The generative response subsystem 118 may then reattempt the method 700 to generate a generative MLM response that is more relevant, accurate, or of a higher quality.

In some embodiments, determining whether two query embeddings are within a threshold similarity may include performing a nearest neighbor search, determining a cosine similarity between the query embeddings, or some other calculation that can determine a distance between multiple query embeddings.

The generative response subsystem 118 may accept multiple types of user queries as prompts for a generative MLM 120 in order to provide generative answers. One type of user query may include a prompt to generate meaning from content. Generating meaning from content may include generating text or other data, based on documents on the platform 100, that helps the prompting user to use content on the platform 100 without having to consume a large amount of the content manually. Prompts of this type may include commands such as "summarize," "prepare," "explain," "catch me up," or other commands. For example, these types of prompts may include "Summarize Sales-Report-7" where Sales-Report-7 is a file, "Prepare me for my upcoming meeting," "Catch me up on Project Blue," etc.

Another type of user query may include answering a specific question about the content. These types of prompts may provide a specific answer to a question where the answer can be found in one or more of the documents on the platform 100. Prompts of this type may include "What is the maximum file size you can upload to the website?" "Where can I find the sales reports?" "Who is in charge of document support services?" etc.

Another type of user query may include information synthesis. These types of prompts request the generative response subsystem to gather information from multiple documents on the platform 100 and combine the gathered information in a concise manner to answer the query. Prompts of this type may include "Show me all files related to sales," "Summarize the folder /documents/sales-reports/," "Explain Project Blue to me," "Prepare me for my meeting on Tuesday about project timelines," "Organize my files," etc.

Figure 8:
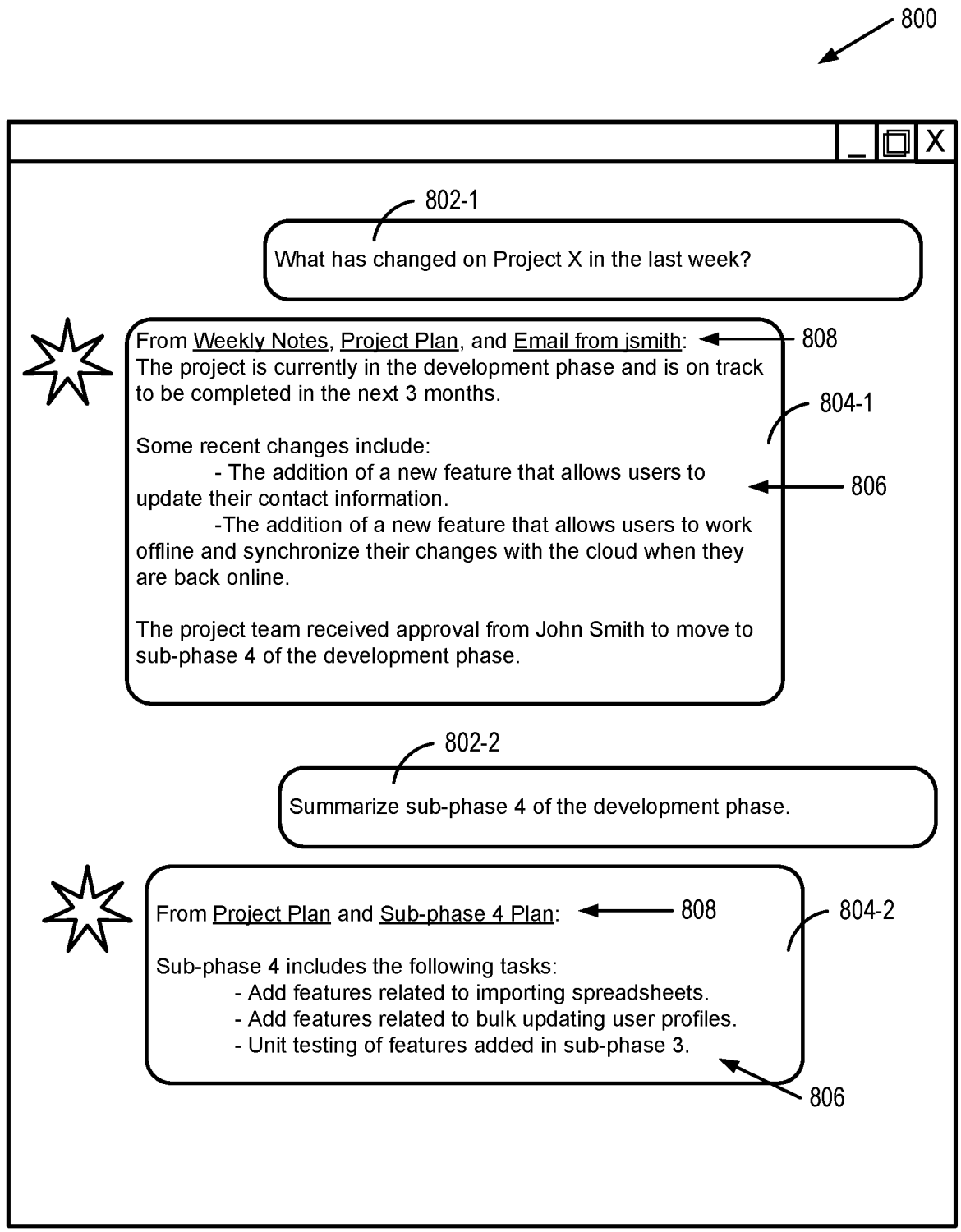
FIG. 8 illustrates an example user interface with generative machine learning model (MLM) prompts and generative MLM responses in accordance with implementations of the present disclosure.

FIG. 8 illustrates one example of a user interface 800. The user interface 800 may include a user interface of the platform 100 that is displayed on a client 140-1. The user interface 800 may be configured to allow a user to submit a generative MLM prompt and receive a generative MLM response according to the disclosure regarding the methods 500, 600, or 700.

The user interface 800 may include a text input box 802-1. A user of the platform 100 may input the generative MLM prompt in the text input box 802-1 and submit the generative MLM prompt to the cloud content management system 110. The generative response subsystem 118 may perform one or more steps of the methods 500, 600, or 700 and generate a generative MLM response. The cloud content management system 110 may send the generative MLM response to the client 140-1, which may display the generative MLM response in a text box 804-1. The text box 804-1 can include text content 806 that provides a response to the user's generative MLM prompt from the text input box 802-1.

The text box 804-1 may include text content 808 that includes one or more citations to documents in the cloud storage of the platform 100 that support the text content 806 of the generative MLM response. The citations text content 808 may include links to those documents, and the user may interact with those links using the user interface 800 (e.g., by clicking on the links) to open up the documents in the user interface 800 or some other user interface provided on a display device of the client 140-1. In some cases, the text content 806 or the citation text content 808 may include highlighting or some other indication that may indicate which document(s) support which text content 806 of the generative MLM response.

As can be seen in FIG. 8, the user may input, into a second text input box 802-2, another generative MLM prompt. This second generative MLM prompt may include, as is shown in FIG. 8, a follow-up prompt that seeks more information about the first generative MLM response shown in the first text box 804-1. The generative response subsystem 118 may use the generative MLM 120 to generate another generative MLM response and provide it to the client 140-1, to display on the user interface 800 in text box 804-2. As can also be seen in FIG. 8, the citation text content 808 of the second text box 804-2 contains a different subset of documents than those of the first text box 804-1. This indicates that a different subset of documents were used to generate the second generative MLM response.

Providing generative answers using a generative MLM 120, as discussed herein, may provide a user with verifiable responses to a prompt processed by a generative MLM 120 and that focuses on relevant and accessible documents in a user's cloud storage on a cloud-based content management platform 100. As such, the efficiency of cloud-based content management platforms 100 is increased, and user collaboration is expedited. In addition, by eliminating time-consuming user searching and reviewing of numerous documents and by using generative MLMs 120 to perform tasks on the platform, the use of processing resources is improved, and memory consumption is reduced. In addition, providing generative answers may include determining, using query embeddings from an embedding model, a smaller set of relevant documents (as compared to all documents accessible to a user), and generating responses to the user's generative MLM prompts using a generative MLM 120. As a consequence, computing resources and network bandwidth required by unnecessary transfer of documents inside the cloud-based content management platform and downloads from server to client are reduced or eliminated.

In some implementations of the disclosure, the platform 100 may preemptively generate personalized generative MLM prompts for a user based on the documents in cloud storage that the user can access. These personalized prompts may include generative MLM prompts that the user may find useful or helpful because they are tailored to the user and may be based on recent activity in documents of the platform 100 that the user can access. The user may then user a user interface of the platform 100 to submit one of these generative MLM prompts to the platform 100 so the platform 100 can generate a generative MLM response using a generative MLM 120.

FIG. 9 is a flowchart illustrating an example method 900 of providing personalized prompts to users based on documents in cloud storage, in accordance with implementations disclosed herein. For convenience, the operations of the flowchart are described with reference to a system that performs the operations. This system may include various components of various computer systems, such as the personalized prompt subsystem 114. Moreover, while operations of method 900 are shown in a particular order, this is not meant to be limiting. One or more operations may be reordered, omitted, or added.

At block 910, the personalized prompt subsystem 114 may select one or more documents stored in a cloud-based content management platform based on a selection criterion. These one or more documents may be referred to as the "working set." In response to a document not conforming to the selection criterion, the personalized prompt subsystem 114 may exclude the document from the working set.

In some embodiments, the personalized prompt subsystem 114 may select documents for inclusion in the working set in response to the personalized prompt subsystem 114 determining that one or more users may have interest in that specific set of documents. A user may have more interest in documents that have been created, opened, or modified more recently than documents that were created long ago or documents that have not been opened or modified recently. A user may have more interest in documents that the user itself created, opened, or modified. A user may have interest in documents that other users created, opened, or modified. A user may have more interest in documents that relate to documents that were created, opened, or modified recently. The selection criterion may assist the personalized prompt subsystem 114 in determining which documents may interest a user.

In one embodiment, the selection criterion may include the metadata associated with the document including a last modified date that is within a predetermined time threshold. Thus, the personalized prompt subsystem 114 may exclude a document if the document was last modified beyond the predetermined time threshold. The selection criterion may include the metadata associated with the document including a last opened date that is within a predetermined time threshold. The selection criterion may include the metadata associated with the document including a creation date that is within a predetermined time threshold. The creation date may include the date or time when the document was generated on the platform 100 or uploaded to the platform 100.

In some embodiments, the selection criterion may include the metadata associated with the document including a date when the document was last commented on by a user that is within a predetermined time threshold. The cloud content management system 110 may allow users to comment on a document. A comment may include a portion of data that may include text and may be associated with a document or a document portion. The comment may allow a user to provide data relating to a document without modifying the document's contents. In some embodiments, the document's metadata may not store a date or time at which the document was last commented on, but the cloud content management system 110 may process the comments associated with a document to determine the date and time of the last comment associated with the document.

The selection criterion may include a query embedding associated with a document being within a threshold similarity to a query embedding of a document that a user has created, opened, or modified within a threshold time period. The selection criterion may include a query embedding associated with a document being within a threshold similarity to a query embedding of search terms that a user has recently searched on the platform 100. In response to a document's query embedding being within the threshold similarity, the document may be included in the working set.

In one embodiment, a predetermined time threshold may be a week. Thus, any document that has not been modified within the last week may be excluded from the working set. The predetermined time threshold may include any amount of time or time period. For example, the time threshold may include within the last day, within the last two days, within the last three days, within the last week, within the last two weeks, within the last month, or within the last year, or other length of time. The time threshold may include a specified day, two days, three days, week, two weeks, month, year, or other time period.

A document in the working set may include metadata that may indicate an owner of the document. The document owner may be a user of the platform 100 that has ownership over the document. Having ownership over the document may include having permissions to open, modify, delete, or otherwise act on the document. Having ownership may include having permissions to determine which users of the platform 100 can open, modify, delete, or otherwise act on the document. In some embodiments, the metadata of the documents in the working set may indicate that at least two documents in the working set have different owners. Thus, the working set may include multiple documents, some of which may have different owners. This may allow the personalized prompt subsystem 114 to generate personalized prompts based on documents other than those owned by a single user.

In some embodiments, the working set may include one or more documents stored in the same folder on the platform 100. The working set may include all documents stored in the folder. Documents stored outside of the folder may be excluded from the working set.

At block 920, the personalized prompt subsystem 114 may select a portion of a document in the working set. In one embodiment, the document may include multiple pages (e.g., the document may include a word processing document or a PDF file). The selected document portion may include a predetermined number of pages. For example, the predetermined number of pages may include one page, two pages, three pages, four pages, or five or more pages. The pages may include the first pages in the document, or pages indicated by the metadata of the document. In some embodiments, the portion of the document selected in block 920 may include a paragraph, a sentence, a section, or some other portion of the document. In some embodiments, the selected portion of the document may include the entire contents of the document.

In one embodiment, block 920 may include the personalized prompt subsystem 114 retrieving a query embedding associated with a document in the working set. The query embedding may include the query embedding generated by an embedding model as part of a document preparation process performed by the cloud content management system 110, as discussed herein. Block 920 may include the personalized prompt subsystem 114 generating, via the embedding model, a query embedding based on a portion of the document in the working set. Block 920 may include, responsive to the query embedding of the document portion being within a threshold similarity from the retrieved query embedding associated with the document, selecting the portion of the document. This process of selecting a document portion only if the document portion's query embedding is similar to the document may help prevent the personalized prompt subsystem 114 from selecting document portions that are not similar to the document they are contained in and, thus, may prevent the personalized prompt subsystem 114 from expending computing resource on using document portions that may not be relevant to the documents in the working set.

In some embodiments, block 920 may include the personalized prompt subsystem 114 retrieving query embeddings associated with the documents in the working set, and each document in the working has at least one associated query embedding. Block 920 may include the personalized prompt subsystem 114 generating, using the embedding model, a query embedding based on a portion of the document in the working set. Block 920 may include, responsive to the query embedding of the document portion being within a threshold similarity from at least one of the retrieved query embeddings associated with the documents in the working set, the personalized prompt subsystem 114 selecting the document portion. This process of selecting a document portion based on its similarity to at least one of the documents' query embeddings in the working set may help select document portions that are similar to documents in the working set.

At block 930, the personalized prompt subsystem 114 may generate a generative MLM prompt using a generative MLM 120. Generating the generative MLM prompt may be based on the selected portion of the document from block 920. In some embodiments, the generative MLM prompt may be based on a second generative MLM prompt. The second generative MLM prompt may include a command to generate a generative MLM prompt about the selected portion of the document of block 920.

In some embodiments, the command to generate the generative MLM prompt about the selected document portion may include a command to generate a generative MLM prompt to summarize the working set. For example, the generated generative MLM prompt may be the text "Summarize the following files:" appended with a list of documents that make up the working set. The command to generate the generative MLM prompt may include a command to generate a generative MLM prompt to identify modifications to the working set. For example, the generated generative MLM prompt may be the text "What changes have been made to X in the last week?" where "X" is replaced with a list of documents in the working set. The generative MLM prompt may include other types of commands discussed herein, such as commands to prepare the user for an upcoming meeting using the working set, commands to generate a response to a question about the working set, showing the user files related to the working set, or other commands.

At block 940, the personalized prompt subsystem 114 may associate the generative MLM prompt generated in block 930 with the document portion selected in block 920. Associating the generative MLM prompt with the document portion may include associating the generative MLM prompt with the document that contains the document portion. Associating the generative MLM prompt with the document portion may include associating the generative MLM prompt with the working set (e.g., associating the document portion with each document of the working set). Associating the generative MLM prompt with the document portion, document, or working set may include generating and storing a logical link or other reference data between the prompt and the document portion, document, or working set so that the cloud content management system 110 can quickly and efficiently find one from the other. By associating the generative MLM prompt with the document portion, document, or working set, the personalized prompt subsystem 114 may quickly determine what document portions or documents the personalized prompt subsystem 114 can use as the context for the generative MLM prompt when inputting the generative MLM prompt into a generative MLM 120 to provide generative answers.

In one embodiment, at block 950, the cloud content management system 110 may cause the generative MLM prompt of block 940 to be presented to one or more users of the cloud-based content management platform 100 when the one or more users access the platform 100. This may include the cloud content management system 110 providing, on a user interface, a selectable option to input the generative MLM prompt into a text input field of the user interface. The user interface may include a user interface of a client 140-1. The text input field may capture the generative MLM prompt and submit it to the cloud content management system 110 over the computer network 150.

The selectable option may appear below a search field of the user interface. The search field may include a text input field used for performing searching functionality on the cloud file system of the platform 100. The selectable option may appear underneath a search result of the user interface.

The selectable option may appear in a hover card. A hover card may include a user interface component that pops up on the user interface in response to a user hovering a mouse cursor over a document or a folder icon in the user interface of the cloud file system. The selectable option may appear in a context menu that may appear on the user interface in response to the user right-clicking on a document or folder icon. The selectable option may appear in a toolbar of the user interface. The toolbar may appear above or to the side of a list of document or folder icons in the user interface of the cloud file system. The selectable option may appear in a sharing configuration pop up of the user interface. A sharing configuration pop up may include a user interface component that appears in response to a user attempting to give another user permission to view, modify, or otherwise access a document or folder of the cloud storage. The generative MLM prompt of these selectable options may include a generative MLM prompt that was associated with the document, document portion, folder, or other group of documents at block 940.

In some implementations, a generative MLM prompt generated using the method 900 may apply to a single user. In other implementations, the generative MLM prompt may apply to multiple users. The multiple users may belong to the same organization, a team within the organization, or some other group. The multiple users may include users that have the same or a similar working set.

Figure 10:
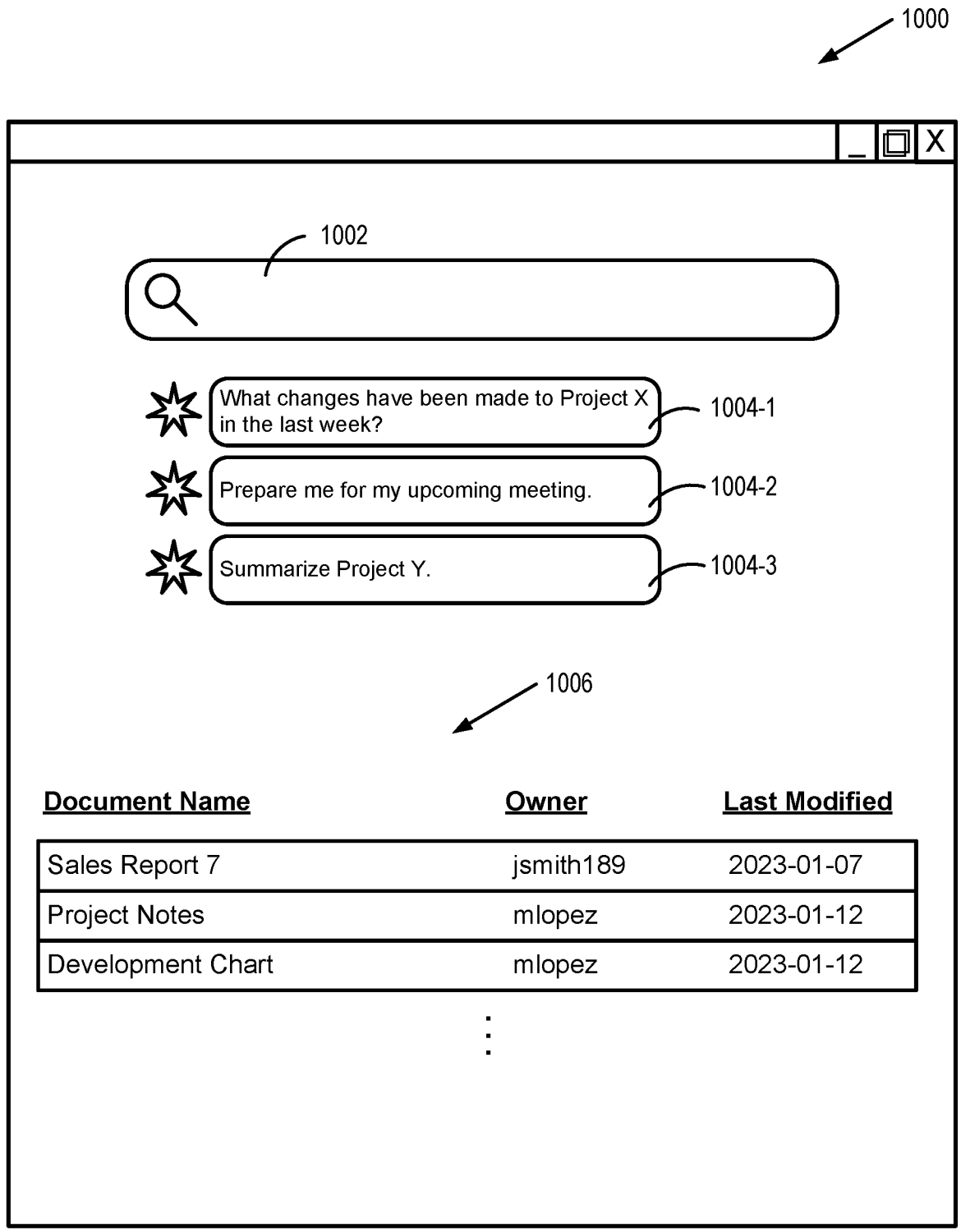
FIG. 10 illustrates an example user interface with personalized generative MLM prompts in accordance with implementations of the present disclosure.

FIG. 10 illustrates one example of a user interface 1000. The user interface 1000 may include a user interface of the platform 100 that is displayed on a client 140-1, . . . , 140-m. The user interface 1000 may be configured to display one or more personalized generative MLM prompts that were generated according to the method 900.

The user interface 1000 can include a text input field 1002. The text input field 1002 may include a search field or some other type of text input field. As can be seen in FIG. 10, the user has not provided any input to the text input field 1002. However, the user interface 1000 has still caused selectable options 1004-1, . . . , 1004-3 to be presented to the user that is using the user interface 1000 when the user accesses the platform 100 though the user interface 1000. Each selectable option 1004-1, . . . , 1004-3 may include a generative MLM prompt. The generative MLM prompt may have been generated according to the method 900. A user of the user interface 1000 may select one of the selectable options 1004-1, . . . , 1004-3. In response, the user interface 1000 may automatically populate the text input field 1002 with the text of the selected generative MLM prompt so the user can submit the generative MLM prompt to the cloud content management system 110 in order to receive a generative MLM response, as discussed herein.

The user interface 1000 may include a list 1006 of one or more documents stored on the platform 100 that are accessible to the user. Thus, the functionality of presenting generative MLM prompts to the user and allowing the user to submit generative MLM prompts to the cloud content management system 110 may be integrated into other functionality of the platform 100.

In some embodiments, the platform 100 may generate suggested generative MLM prompts for a user in real time based on a variety of factors, including data that the user has input into a user interface of the platform 100 or documents in cloud storage of the platform 100 that the user can access. These suggested generative MLM prompts may include prompts that the user may find helpful because they may improve the user's interaction with the platform 100 by providing prompts in real time that may improve on the prompts the user is currently inputting into the platform 100 or prompts that the user has recently input. The user may then user a user interface to submit one of these generative MLM prompts to the platform 100 so the cloud content management system 110 can generate a generative response using a generative MLM 120.

FIG. 11 is a flowchart illustrating an example method 1100 of providing real-time anticipation of user interest in information contained in documents in cloud storage, in accordance with implementations disclosed herein. For convenience, the operations of the flowchart are described with reference to a system that performs the operations. This system may include various components of various computer systems, such as the real-time anticipation subsystem 116. Moreover, while operations of method 900 are shown in a particular order, this is not meant to be limiting. One or more operations may be reordered, omitted, or added.

At block 1110, the real-time anticipation subsystem 116 may identify an action of a user of the cloud-based content management platform 100 with respect to one or more first documents of multiple documents. The multiple documents may be stored at the platform 100. The action of the user may include an action of a user on a user interface. The user interface may include a user interface of a client 140-1, . . . , 140-m.

In one implementation, the action of the user may include the user inputting text data into a text input field of the user interface. The text data may include a search term being input into a search field of the user interface or some other text input field. The action of the user may include the user selecting a document or a folder displayed by the user interface. The action of the user may include the user opening a document or folder displayed by the user interface. The action of the user may include the user hovering a mouse cursor over a document or folder. The action of the user may include some other action using the user interface in order to interact with the platform 100. The client 140-1 may send the data identifying the action of the user to the cloud content management system 110 over the computer network 150.

The one or more first documents of the multiple documents stored at the platform 100 may include documents that pertain to a user's organization. For example, the user may pertain to an organization, and the one or more first documents may include the documents on the platform that have been created, uploaded, or otherwise provided by the organization or the users of the platform 100 that pertain to the organization.

At block 1120, the real-time anticipation subsystem 116 may predict user interest in content of one or more second documents of the plurality of documents stored at the platform 100. The one or more second documents may at least partially overlap with the one or more first documents. The real-time anticipation subsystem 116 may anticipate, in real-time, information or documents the user may be interested in based on the action of the user. This may allow the user to retrieve relevant information from the platform 100, in real time, without having to search the documents stored by the platform 100 or without having to be familiar with the documents or the arrangement of the documents on the platform 100.

Block 1120 may include one or more subblocks 1122-1126. At block 1122, the real-time anticipation subsystem 116 may select the one or more second documents stored in the cloud-based content management platform 100. The selection may be based on a selection criterion. These one or more selected second documents may be referred to as the "working set." In response to a document of the one or more first documents not conforming to the selection criteria, the real-time anticipation subsystem 116 may exclude the document from the working set. Selecting the working set may include functionality similar to block 910 of FIG. 9. For example, the selection criterion may include criteria related to a last modified date of a document, a last opened date of a document, or a last commented-on date of a document. The selection criterion may include a query embedding of a document being similar to a query embedding of a document the user has recently accessed, or the query embedding of the document being similar to search terms the user has recently searched on the platform 100. The selection criterion may include selecting from documents that a user has permission to open, modify, or otherwise access. The selection criterion may include selecting documents that are in the same folder in the cloud storage.

In one implementation, where the action of the user includes text data input into the user interface, the selection criterion of block 1122 may include a similarity to the text data. The real-time anticipation subsystem 116 may identify one or more documents stored in the cloud-based content management platform 100 and may rank these one or more documents based on the text data. For example, the real-time anticipation subsystem 116 may input a search query, based on the text data, into a search functionality of the platform 100. The search functionality may return a list of search results. The list of search results may include documents stored in the cloud storage of the platform 100. The cloud content management system 110 may rank the documents based on the text data, which may include ranking the results from most relevant to the text data to the least relevant. The cloud content management system 110 may determine relevancy by comparing a query embedding of the text data to a query embedding associated with the document (which may include a query embedding of a document portion of the document). The cloud content management system 110 may then select a threshold number of highest-ranked documents from the one or more documents. The threshold number of documents may include one document, two documents, three documents, four documents, five documents, or six or more documents. These selected highest ranked documents may form the working set.

At block 1124, the real-time anticipation subsystem 116 may select a portion of a document in the working set. The selection may be based on the action of the user of block 910. For example, where the action of the user includes input text data, an embedding model may generate a query embedding based on the text data and may compare the query embedding to a query embedding of a portion of a document in the working set. If the query embeddings are within a threshold similarity, the portion of the document may be selected. In another example, where the action of the user includes a selection of a document, an embedding model may generate a query embedding based on the document and may compare the query embedding to a query embedding of a portion of a document in the working set. If the query embeddings are within a threshold similarity, the portion of the document may be selected.

In some implementations, block 1124 may include generating a query embedding based on a portion of the document. Block 1124 may include retrieving a query embedding associated with the document that includes the portion of the document. Block 1124 may include comparing the query embedding of the document portion to the query embedding of the document and calculating a similarity of the two query embeddings. If the query embeddings are within a threshold similarity, the real-time anticipation subsystem 116 may select the document portion. This selection process may help select document portions that are similar to the documents that they are contained within, which may indicate that the document portion is relevant to the action of the user of block 910.

In one embodiment, real-time anticipation subsystem 116 may compare the query embedding of the document portion to the respective query embedding of each document in the working set. The real-time anticipation subsystem 116 may determine whether the query embedding of the document portion is within a threshold similarity to any of the documents' respective query embeddings. If so, the real-time anticipation subsystem 116 may select the document portion. This selection process may help select document portions that are similar to at least one of the documents in the working set.

In some embodiments, the portion of the document may include multiple document portions. The multiple document portions may be contained in different documents of the working set. In some embodiments, each document portion may be contained in a different document of the working set. In one embodiment, the portion of the document selected in block 930 may be the entire document.

At block 1126, the real-time anticipation subsystem 116 may generate a generative MLM prompt via a generative MLM 120. The generative MLM 120 may generate the generative MLM prompt based on the selected portion of the document of block 1124. The generative MLM prompt may include a generative MLM prompt that the user may find helpful and relevant to the action of the user of block 1110.

In one embodiment, block 1126 may include generating a second generative MLM prompt. This second generative MLM prompt may include context for the generative MLM 120. The context may include data identifying the user action and the portion of the document selected in block 1124. The second generative MLM prompt may include a command for the generative MLM 120 to generate a generative MLM prompt about the action of the user. Block 1126 may include the real-time anticipation subsystem 116 inputting the second prompt into the generative MLM 120. In response, the generative MLM 120 may generate the first generative MLM prompt.

At block 1130, the real-time anticipation subsystem 116 may cause the generative MLM prompt generated in block 1126 to be presented to the user in relation to the action of the user. Block 1130 may include the cloud content management system 110 sending the generative MLM prompt to the user interface on the client 140-1 so the user interface can display the generative MLM prompt to the user. The user interface may display the prompt as a selectable option.

In some embodiments, the real-time anticipation subsystem 116 may be further configured to store the generative MLM prompt that the real-time anticipation subsystem 116 generated during block 1126. The real-time anticipation subsystem 116 may store the generative MLM prompt in the cloud storage servers 130-1, . . . , 130-n. The real-time anticipation subsystem 116 may store the generative MLM prompt in a generative MLM prompt library. This may allow the cloud content management system 110 to provide the generative MLM prompt to other users of the platform 100 as a suggested prompt.

As an example of the method 1100, at block 1110, the real-time anticipation subsystem 116 may identify an action of the user. The action of the user may include the user inputting text data into a user interface of the platform 100. The text data may be the words "file size." At block 1120, the real-time anticipation subsystem 116 may predict the user's interest in content in one or more documents that the user's organization hosts on the platform 100. This may include, at block 1122, the real-time anticipation subsystem 116 selecting one or more second documents stored in the cloud storage of the platform 100. These selected documents may form the working set. The selection criteria may include documents that have been opened within the past week and documents that the user has permission to view. At block 1124, the real-time anticipation subsystem 116 may select a document portion from the working set, and the document portion may include a paragraph that includes information about file sizes. The real-time anticipation subsystem 116 may select this document portion in response to a query embedding of the document portion being within a threshold similarity to a query embedding of the text data, i.e., the words "file size." At block 1126, the real-time anticipation subsystem 116 may input the paragraph selected in block 1124 into the generative MLM 120. For example, the input may be in the format:

Statement: [the paragraph selected in block 1124]
Prompt: Generate a question about the previous statement.

The generative MLM 120 may generate a generative MLM prompt based on this input. The generative MLM prompt may include "What is the maximum file size allowed by the website?" At block 1130, the real-time anticipation subsystem 116 may cause this generative MLM prompt to be presented to the user in relation to the action of the user. In this example, this includes the client 140-1 receiving the generative MLM prompt over the computer network 150. The client's 140-1 user interface may display the generative MLM prompt as a selectable option below the text input field where the user inputted the text data so the user can submit the generative MLM prompt to a generative MLM 120 of the platform 100 and receive a generative MLM response.

FIG. 12 is a flowchart illustrating an example method 1200 of a client-side method of providing real-time anticipation of user interest in information contained in documents in cloud storage, in accordance with implementations disclosed herein. For convenience, the operations of the flowchart are described with reference to a system that performs the operations. This system may include various components of various computer systems, such as the real-time anticipation subsystem 116. Moreover, while operations of method 1200 are shown in a particular order, this is not meant to be limiting. One or more operations may be reordered, omitted, or added.

At block 1210, a user interface of a client 140-1 may receive an action of a user. The user input may include text data, the selection of a document or folder, etc. As discussed above in relation to block 1110 of FIG. 11, the user interface may include a text field where a user of the client 140-1 may enter the text data, a list of documents where the user can select a document or folder, etc.

At block 1220, the client 140-1 may send data identifying the action of the user to the cloud content management system 110. The client 140-1 may send the data identifying the action of the user over the computer network 150. The cloud content management system 110 may receive the data identifying the user action at block 1110 of FIG. 11. The cloud content management system 110 may perform one or more blocks 1110-1130 of the method 1100 of FIG. 11. At block 1130, the cloud content management system 110 may provide a generative MLM prompt to the client 140-1.

At block 1230, the client 140-1 may receive, over the computer network 150, the generative MLM prompt from the cloud content management system 110. At block 1240, the client 140-1 may provide, on the user interface of the client 140-1, a selectable option. The selectable option may include an option to send the generative MLM prompt to the cloud content management system 110 over the computer network 150.

In one embodiment, the client 140-1 may display the user interface of the platform 100, and the user interface may include a search field wherein the user of the client 140-1 can input text or other data to perform searches of the documents or other data on the platform 100. At block 1240, the user interface may provide the selectable option as a text box. The text box may include the generative MLM prompt. In some embodiments, the user interface may display the text box below a search field of the user interface. For example, in response to the user typing the user input in the search field, even before the user submits the user input to the platform 100, the client 140-1 may send the user input to the platform 100 (block 1210) and receive the generative MLM prompt (block 1230) and display the generative MLM prompt in a text box below the search field so the user can easily see the suggested generative MLM prompt. In one embodiment, the user interface may display the text box below one or more search results. For example, after the user has submitted the user input to the platform 100 and received search results in response, the client 140-1 may display the generative MLM prompt below the received search results. The client 140-1 may send the user input in block 1010 or receive the generative MLM prompt in block 1230 asynchronously from a search that the user of the client 140-1 performs using the user interface.

The user interface may include a list of documents or folders stored by the platform 100. The documents may include documents stored in the same folder or may include documents listed in search results in response to a user's search of the platform 100. At block 1240, the client 140-1 providing the selectable option may include the user interface displaying the selectable option in response to a user selection of a document in the list of documents. The user selection may include the user left-clicking on the document, tapping the document on a touchscreen, right-clicking on the document, tapping and holding the document on a touchscreen, or some other user selection. For example, in response to the user right-clicking on a document in the list, the user interface may display a context menu, and the context menu may include the selectable option of "Summarize this document."

In one embodiment, the user interface may include a folder stored by the platform 100. At block 1240, the client 140-1 providing the selectable option may include the user interface displaying the selectable option in response to the user selection of the folder. For example, in response to the user right-clicking on the folder, the user interface may display a context menu with the selectable option "Explain the changes that occurred in this folder within the past week."

The user interface may display the selectable option in other areas of the user interface. For example, the user interface may display the selectable option in a hover card. A hover card may include a user interface component that, in response to the user selecting the document on the user interface, displays part of the selected document or information about the selected document in a small window (the "card"). The selectable option may be included in the hover card. The user interface may display the selectable option in a selection toolbar. The selection toolbar may include a toolbar at the top of a list of documents or at the top of a window. The selection toolbar may include options such as "Create a new document," "Upload a document," "Delete a document," "Share a document," etc.

The method 1200 may include the client 140-1 sending the generative MLM prompt received in block 1230 to the cloud content management system 110 over the computer network 150. The method 1200 may include the client 140-1 receiving, from the cloud content management system 110, a generative MLM response. The generative MLM response may include a generative MLM response as discussed in relation to block 550 of FIG. 5. The generative MLM response may include a citation to a document stored on the platform 100.

Figure 13A:
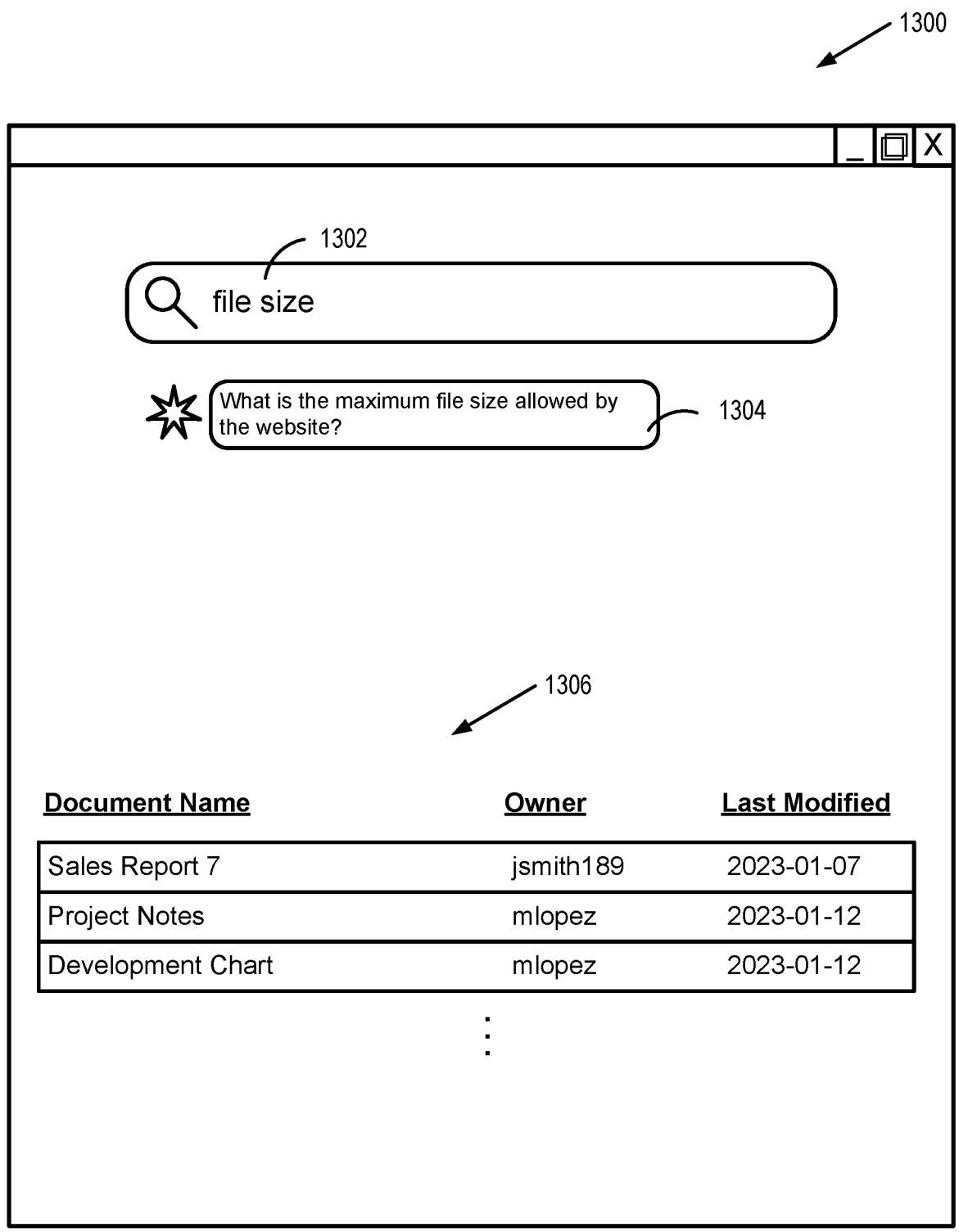
FIG. 13A illustrates an example user interface with real-time anticipated generative MLM prompts in accordance with implementations of the present disclosure.

FIG. 13A illustrates an example of a user interface 1300. The user interface 1300 may include a user interface of the platform 100 that is displayed on a client 140-1. The user interface 1300 may be configured to receive a user action and present a generative MLM prompt as a selectable option to the user.

As can be seen in FIG. 13A, the user interface 1300 may include a text input box 1302 where a user may input text. In FIG. 13A, the user has input the text data "file size" into the text input box 1302. Even before the user submits the text data to the cloud content management system 110 as a search query, the user interface 1300 has sent the text data to the cloud content management system 110 as data identifying an action of a user in order to generate a generative MLM prompt as discussed in relation to the method 1100. Here, the generative MLM prompt may include "What is the maximum file size allowed by the website?" The user interface 1300 receives the generative MLM response as presents it as a selectable option 1304. The user may then see the selectable option 1304 and select it (e.g., by clicking on the selectable option 1304). In response, the user interface 1300 may send the generative MLM response to the generative response subsystem 118. The user interface 1300 may include a list 1306 of one or more documents stored on the platform 100 that are accessible to the user. Thus, the functionality of presenting generative MLM prompts to the user and allowing the user to submit generative MLM prompts to the cloud content management system 110 may be integrated into other functionality of the platform 100.

Figure 13B:
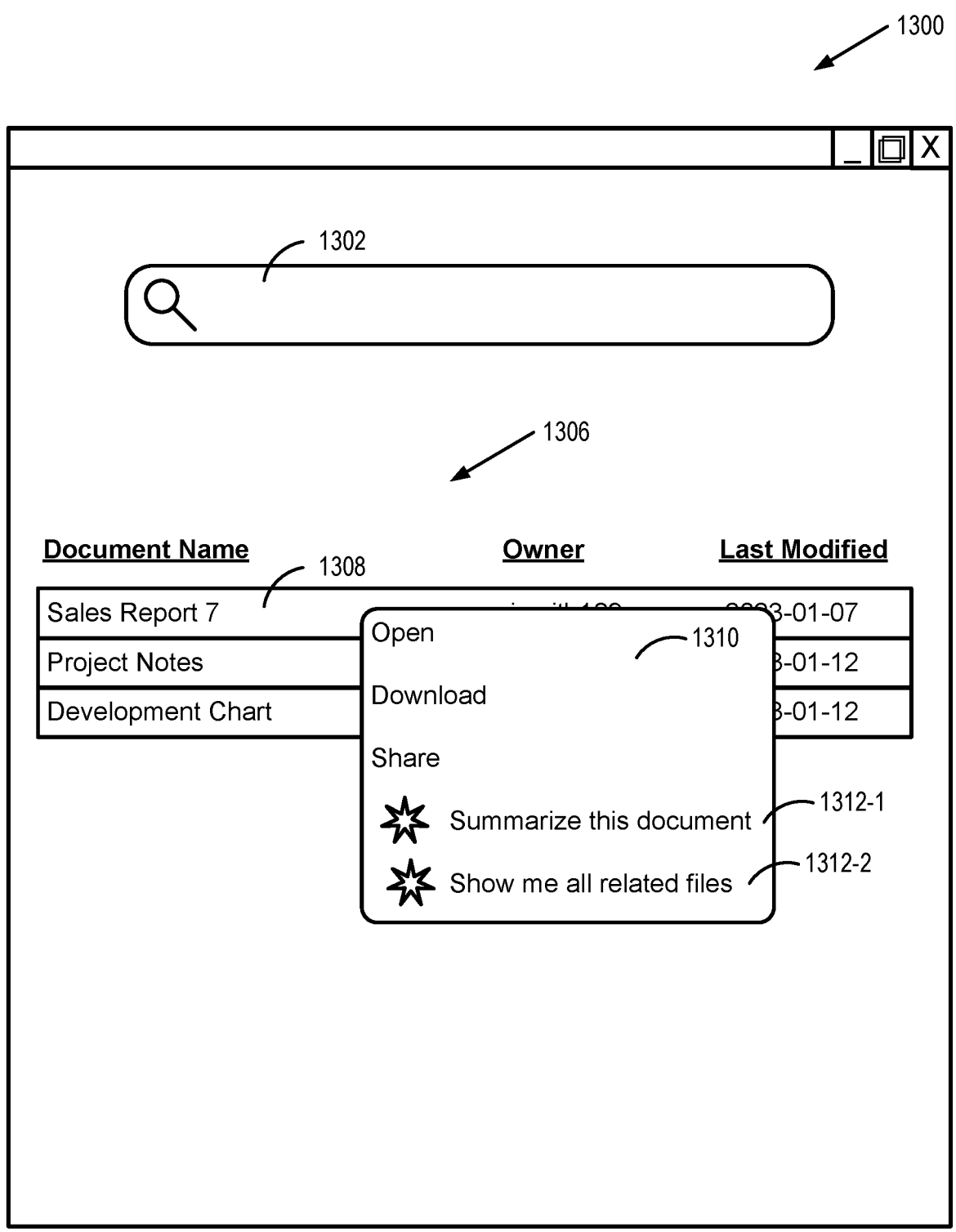
FIG. 13B illustrates another example user interface with further real-time anticipated generative MLM prompts in accordance with implementations of the present disclosure.

FIG. 13B depicts another example of the user interface 1300. In this example, the action of the user is the user right-clicking on a document 1308 in the list 1306 of documents. In response, the user interface 1300 may display a context menu 1310. The context menu may include multiple options pertaining to the document 1308. As can be seen in FIG. 13B, the context menu 1310 may include multiple selectable options that include generative MLM prompts 1312-1, 1312-2 that are associated with the document 1308. These selectable options 1312-1, 1312-2 include "Summarize this document" and "Show me all related files."

In response to the user selecting one of these selectable options 1312-1, 1312-2, the user interface may submit the generative MLM prompt of the selected selectable option 1312-1, 1312-2 to the generative response subsystem 118.

It should be noted that although the cloud content management system 110 is depicted herein as including one generative MLM 120, the cloud content management system 110 may include multiple generative MLMs 120. Each generative MLM 120 of the multiple generative MLMs 120 may have different configurations. Different methods 200, 300, 400, 500, 600, 700, 900, 1100, or 1200 may use different generative MLMs 120, and different blocks of the same method 200, 300, 400, 500, 600, 700, 900, 1100, or 1200 may use different generative MLMs 120. For example, the generative MLM 120 discussed in relation to block 230 of the method 200 may be a different generative MLM 120 than the generative MLM 120 discussed in relation to block 250. In another example, the generative MLM 120 discussed in relation to block 230 of the method 200 may be a different generative MLM 120 than the generative MLM 120 discussed in relation to blocks 540 or 550 of the method 500.

Figure 14:
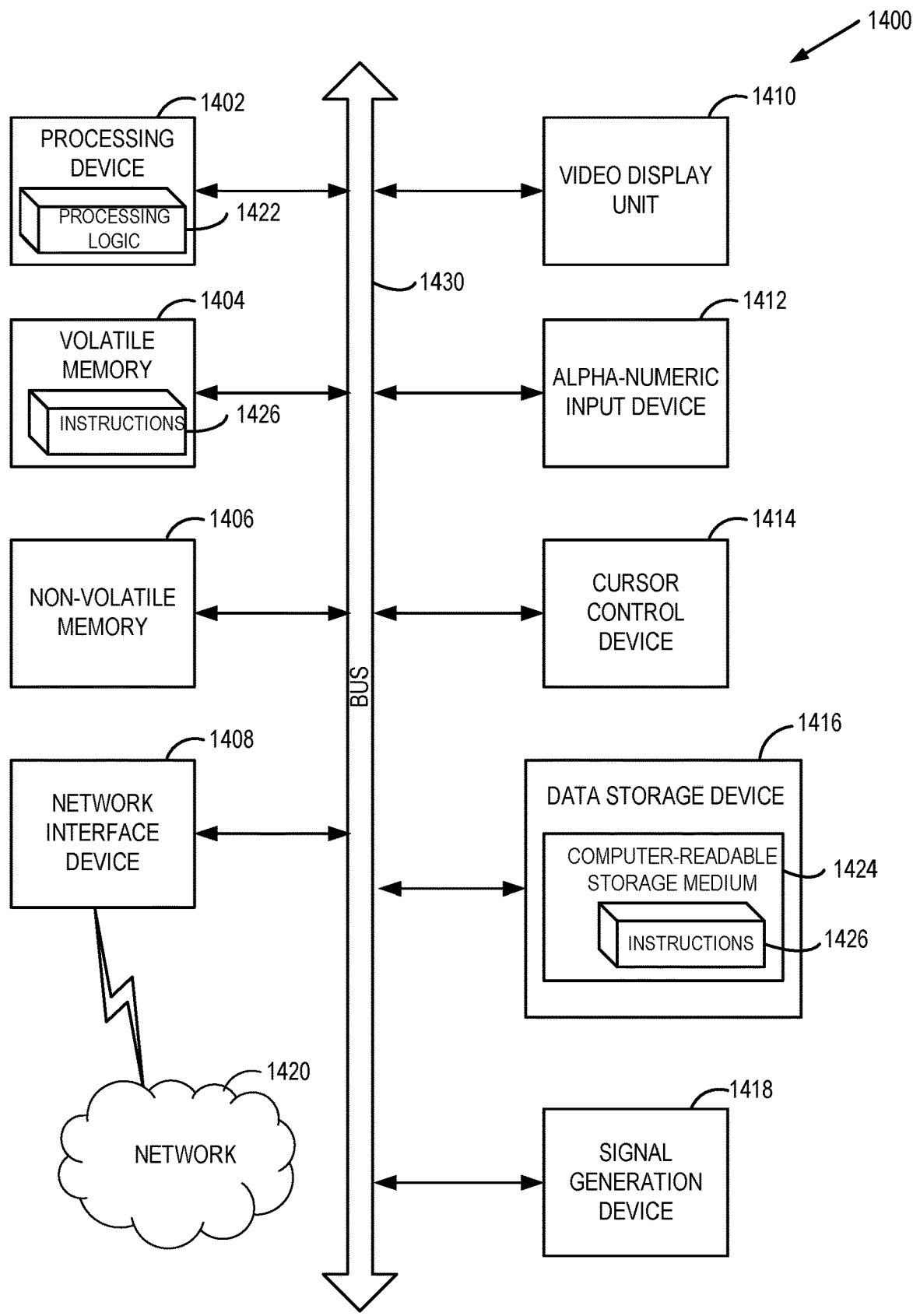
FIG. 14 depicts an example computer system in accordance with selected aspects of the present disclosure.

FIG. 14 is a block diagram illustrating an example computer system 1400, in accordance with implementations of the present disclosure. The computer system 1400 can be the cloud content management system 140, a cloud storage server 130-1, . . . , 130-n, or a client 140-1, . . . , 140-m in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processing device 1402, a volatile memory 1404 (e.g., read-only memory (ROM), flash memory, dynamic random access memory (DRAM) such as synchronous DRAM (SDRAM), double data rate (DDR SDRAM), or DRAM (RDRAM), etc.), a non-volatile memory 1406 (e.g., flash memory, static random access memory (SRAM), etc.), and a data storage device 1416, which communicate with each other via a bus 1430.

The processing device 1402 represents one or more general-purpose processing devices such as a microprocessor, central processing unit, graphics processing unit, or the like. More particularly, the processing device 1402 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1402 can also be one or more special-purpose processing devices such as an application specific integrated circuit (ASIC), a field programmable gate array (FPGA), a digital signal processor (DSP), network processor, or the like. The processing device 1402 is configured to execute instructions 1426 (e.g., for providing generative answers using a generative MLM) for performing the operations discussed herein.

The computer system 1400 can further include a network interface device 1408. The computer system 1400 also can include a video display unit 1410 (e.g., a liquid crystal display (LCD) or a cathode ray tube (CRT)), an input device 1412 (e.g., a keyboard, and alphanumeric keyboard, a motion sensing input device, touch screen), a cursor control device 1414 (e.g., a mouse), and a signal generation device 1418 (e.g., a speaker).

The data storage device 1416 can include a non-transitory machine-readable storage medium 1424 (also computer-readable storage medium) on which is stored one or more sets of instructions 1426 (e.g., for providing generative answers and other functionality disclosed herein) embodying any one or more of the methodologies or functions described herein. The instructions 1426 can also reside, completely or at least partially, within the volatile memory 1404 and/or within the processing device 1402 during execution thereof by the computer system 1400, the volatile memory 1404 and the processing device 1402 also constituting machine-readable storage media. The instructions 1426 can further be transmitted or received over a network 1420 (e.g., computer network 150 of FIG. 1) via the network interface device 1408.

In one implementation, the instructions 1426 include instructions for pre-processing documents in cloud storage for query embeddings, providing personalized generative MLM prompts to users based on cloud storage documents, real-time anticipation of user interest of information contained in cloud storage documents, or providing generative answers that include citation to source documents in cloud storage. While the computer-readable storage medium 1424 (machine-readable storage medium) is shown in an example implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "displaying", "moving", "adjusting", "replacing", "determining", "playing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation," "an implementation," "some implementations," "one embodiment," "an embodiment," or "some embodiments" mean that a particular feature, structure, or characteristic described in connection with the implementation or embodiment is included in at least one implementation or embodiment. Thus, the appearances of the phrase "in one implementation" or "in an implementation" or other similar terms in various places throughout this specification are not necessarily all referring to the same implementation. In addition, the term "or" is intended to mean an inclusive "or" rather than an exclusive "or." Moreover, the word "example" or a similar term are used herein to mean serving as an example, instance, or illustration. Any aspect or design described herein as an "example" is not necessarily to be construed as preferred or advantageous over other aspects or designs. Rather, use of the word "example" or a similar term is intended to present concepts in a concrete fashion.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
obtaining a generative machine learning model (MLM) prompt, wherein the generative MLM prompt includes an indication of a user request to generate content based on one or more documents stored in a cloud-based content management platform;
generating, using an embedding model, a first query embedding based on the generative MLM prompt;
selecting, from a plurality of documents stored in the cloud-based content management platform, a subset of the plurality of documents, wherein the selection of the subset is based on the generative MLM prompt and the first query embedding;
inputting the generative MLM prompt and the subset of the plurality of documents into a first generative MLM; and generating, using the first generative MLM, a response, wherein the response comprises content generated by the first generative MLM, and one or more citations to one or more documents of the subset.

2. The method of claim 1, wherein selecting the subset of the plurality of documents comprises:
inputting the generative MLM prompt into a second generative MLM;
responsive to inputting the generative MLM prompt into the second generative MLM, generating, via the second generative MLM, one or more search terms; and
performing a keyword search on the plurality of documents based on the one or more search terms.

3. The method of claim 2, wherein:
each document of the plurality of documents comprises metadata, wherein the metadata includes a timestamp corresponding to a last time a respective document was opened; and
performing the keyword search on the plurality of documents comprises ranking a document in the plurality of documents higher based on the timestamp of the respective document.

4. The method of claim 1, wherein selecting the subset of the plurality of documents comprises selecting a document of the plurality of documents based on the first query embedding being within a threshold similarity from a second query embedding associated with the document, and including the selected document in the subset.

5. The method of claim 1, wherein:
each document of the plurality of documents comprises metadata, wherein the metadata indicates whether a user has permission to open a respective document; and
selecting the subset of the plurality of documents comprises selecting a document of the plurality of documents based on the metadata, and including the selected document in the subset.

6. The method of claim 1, wherein:
each document of the plurality of documents comprises metadata, wherein the metadata includes a timestamp corresponding to a last time a respective document was modified; and
selecting the subset of the plurality of documents comprises selecting a document of the plurality of documents based on the metadata, and including the selected document in the subset.

7. The method of claim 1, wherein a citation of the one or more citations comprises a link to a document in the subset.

8. The method of claim 1, wherein a citation of the one or more citations comprises a link to a document portion of a document in the subset.

9. A method, comprising:
obtaining a first generative machine learning model (MLM) prompt from a user interface, wherein the first generative MLM prompt includes an indication of a user request to generate content based on one or more documents stored on a cloud-based content management platform;
inputting the first generative MLM prompt and a plurality of documents into a first generative MLM, wherein:
the plurality of documents comprises documents stored on the cloud-based content management platform, and
each document of the plurality of documents comprises a plurality of document portions, and each document portion includes an associated first query embedding;

generating, using the first generative MLM, a first generative MLM response;
generating, via an embedding model, a second query embedding based on the first generative MLM response;
selecting a subset of the plurality of document portions, wherein the first query embedding of each document portion in the subset is within a threshold similarity from the second query embedding; and
including, in the first generative MLM response, content generated by the first generative MLM, and one or more citations to document portions of the subset of the plurality of document portions.

10. The method of claim 9, further comprising providing, on the user interface, the first generative MLM response, wherein the first generative MLM response further includes a highlighting of text of the first generative MLM response.

11. The method of claim 9, wherein a citation of the one or more citations includes a link to a document that includes a document portion of the subset of the plurality of document portions.

12. The method of claim 11, further comprising, responsive to a user interaction with the link to the document that includes the document portion:
opening the document in the user interface; and
highlighting the document portion in the document.

13. The method of claim 9, further comprising:
obtaining a second generative MLM prompt from the user interface; and
responsive to inputting the second generative MLM prompt, the subset of the plurality of documents, and the first generative MLM response into the first generative MLM, generating, using the first generative MLM, a second response.

14. The method of claim 9, wherein a document portion of the plurality of document portions comprises at least one of:
a sentence;
a paragraph; or
a section.

15. The method of claim 9, wherein the generative MLM prompt comprises a generative MLM prompt automatically generated by a subsystem of the cloud-based content management platform.

16. A system, comprising:
a memory; and
one or more processing devices, coupled to the memory, configured to perform operations comprising:
generating, using an embedding model, a first query embedding based on a generative machine learning model (MLM) prompt, wherein the generative MLM prompt includes an indication of a user request to generate content based on one or more documents stored in a cloud-based content management platform;
selecting, from a plurality of documents stored in the cloud-based content management platform, a first subset of the plurality of documents, wherein
each document in the first subset includes an associated second query embedding, and
the selection of the first subset is based on the first query embedding being within a threshold similarity from the second query embedding associated with a respective document of the plurality of documents;
selecting, from the first subset, a second subset of documents, wherein the selection of the second subset is based on an access permission of each document in the first subset;

inputting the generative MLM prompt and the second subset of the plurality of documents into a generative MLM; and generating, using the generative MLM, a response, wherein the response comprises content generated by the generative MLM.

17. The system of claim 16, wherein:

each document of the second subset comprises a plurality of document portions, and each document portion includes an associated third query embedding;

the processing device is further configured to select, from the plurality of document portions of the documents of the second subset, a subset of document portions, wherein the selection of the subset of document portions is based on the first query embedding being within a first threshold similarity from a third query embedding of a plurality of third query embeddings; and inputting the generative MLM prompt and the second subset into the generative MLM comprises inputting the generative MLM prompt and the subset of document portions into the generative MLM.

18. The system of claim 17, wherein the operations further comprise:

generating, via the embedding model, a fourth query embedding based on the generative MLM response;

determining whether the fourth query embedding is within a second threshold similarity from a third query embedding of plurality of third query embeddings; and responsive to determining that the fourth query embedding is not within the second threshold similarity from any third query embedding of the plurality of third query embeddings, rejecting the generative MLM response.

19. The system of claim 16, wherein the generative MLM comprises a transformer-based large language model (LLM).

20. The system of claim 16, wherein each of the first query embedding and the second query embeddings comprises a vector of floats.

* * * * *